(12) United States Patent
Bürk

(10) Patent No.: US 12,286,992 B2
(45) Date of Patent: Apr. 29, 2025

(54) ADAPTER ELEMENT AND CONNECTING DEVICE

(71) Applicant: Lamello AG, Bubendorf (CH)

(72) Inventor: Heinz Bürk, Steinen (DE)

(73) Assignee: Lamello AG, Bubendorf (CH)

( * ) Notice: Subject to any disclaimer, the term of this patent is extended or adjusted under 35 U.S.C. 154(b) by 410 days.

(21) Appl. No.: 17/739,514

(22) Filed: May 9, 2022

(65) Prior Publication Data
US 2022/0260102 A1    Aug. 18, 2022

Related U.S. Application Data

(63) Continuation of application No. PCT/EP2020/081610, filed on Nov. 10, 2020.

(51) Int. Cl.
*F16B 12/26* (2006.01)
*A47B 96/20* (2006.01)

(52) U.S. Cl.
CPC ............ *F16B 12/26* (2013.01); *A47B 96/205* (2013.01); *A47B 2230/0062* (2013.01)

(58) Field of Classification Search
CPC ...... E05C 19/007; E05C 19/02; E05C 19/022; E05C 19/06; E05C 19/063; E05C 19/066; F16B 12/10; F16B 12/20; F16B 12/24; F16B 12/26; F16B 12/32; F16B 12/36; F16B 12/38; Y10T 403/55; Y10T 403/559; Y10T 403/5773; Y10T 403/5793; Y10T 403/7005; Y10T 403/7009; Y10T 403/7015
See application file for complete search history.

(56) References Cited

U.S. PATENT DOCUMENTS

| | | | | |
|---|---|---|---|---|
| 4,639,161 | A * | 1/1987 | Mazaki | F16B 12/20 403/231 |
| 5,096,328 | A * | 3/1992 | Knapp | F16B 12/20 403/364 |
| 5,404,675 | A * | 4/1995 | Schmidhauser | E05D 15/063 16/97 |
| 5,529,428 | A * | 6/1996 | Bischof | F16B 12/14 411/409 |
| 8,092,114 | B2 * | 1/2012 | Baur | E05B 63/123 292/241 |
| 8,240,942 | B2 * | 8/2012 | Baur | F16B 12/2036 403/321 |
| 8,882,416 | B2 * | 11/2014 | Baur | B23C 5/14 409/181 |
| 9,624,959 | B2 * | 4/2017 | Baur | F16B 12/26 |
| 10,113,575 | B2 * | 10/2018 | Baur | G03B 37/00 |
| 10,371,191 | B2 | 8/2019 | Baur et al. | |

(Continued)

FOREIGN PATENT DOCUMENTS

DE   102013203289 A1   8/2014
DE   102014101158 A1   7/2015
(Continued)

*Primary Examiner* — Daniel J Wiley
(74) *Attorney, Agent, or Firm* — ASLAN LAW, P.C.

(57) ABSTRACT

In order to be able to fix a connecting element for furniture and/or machine parts, for example in lightweight panels, it is proposed that an adapter element be used which comprises a receiving section for receiving the connecting element and a fixing section for fixing the adapter element in particular in the lightweight board.

19 Claims, 24 Drawing Sheets

(56) References Cited

U.S. PATENT DOCUMENTS

| | | | |
|---|---|---|---|
| 2005/0036835 A1 | 2/2005 | Shaw et al. | |
| 2010/0111598 A1* | 5/2010 | Baur | F16B 12/2009 |
| | | | 403/348 |
| 2010/0111599 A1* | 5/2010 | Baur | B23C 5/14 |
| | | | 409/207 |
| 2014/0321934 A1* | 10/2014 | Baur | B23C 5/1054 |
| | | | 407/30 |
| 2016/0333912 A1* | 11/2016 | Baur | F16B 12/20 |
| 2016/0333913 A1* | 11/2016 | Baur | E05B 63/123 |
| 2017/0114812 A1* | 4/2017 | Jeker | F16B 12/20 |

FOREIGN PATENT DOCUMENTS

| | | | |
|---|---|---|---|
| EP | 2684490 A1 | 1/2014 |
| EP | 2142042 B1 | 4/2014 |
| EP | 3564541 A1 | 11/2019 |

\* cited by examiner

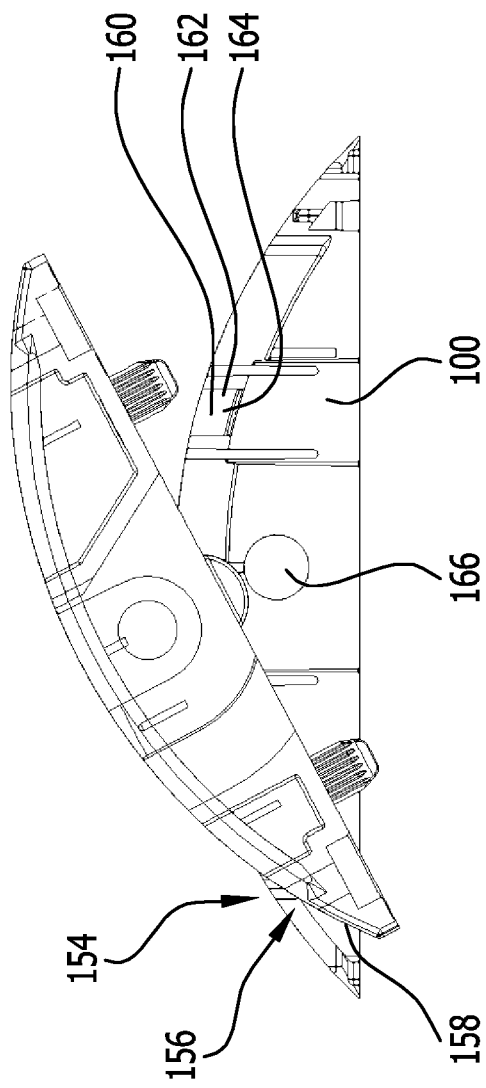
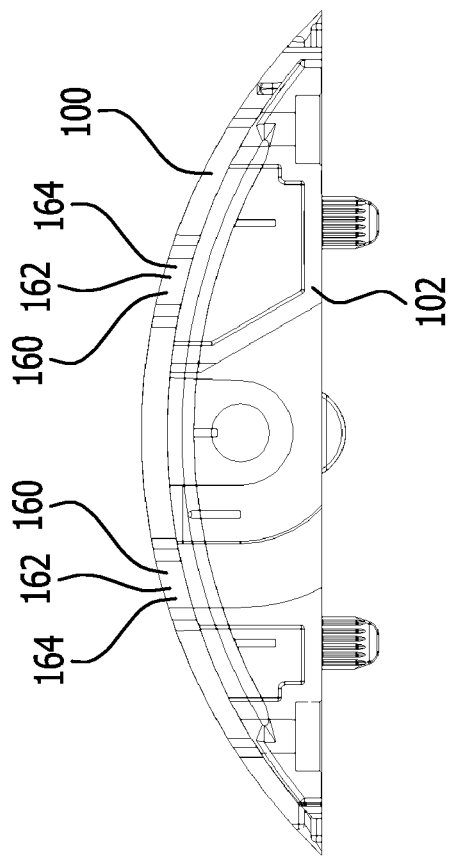
FIG.4
FIG.5

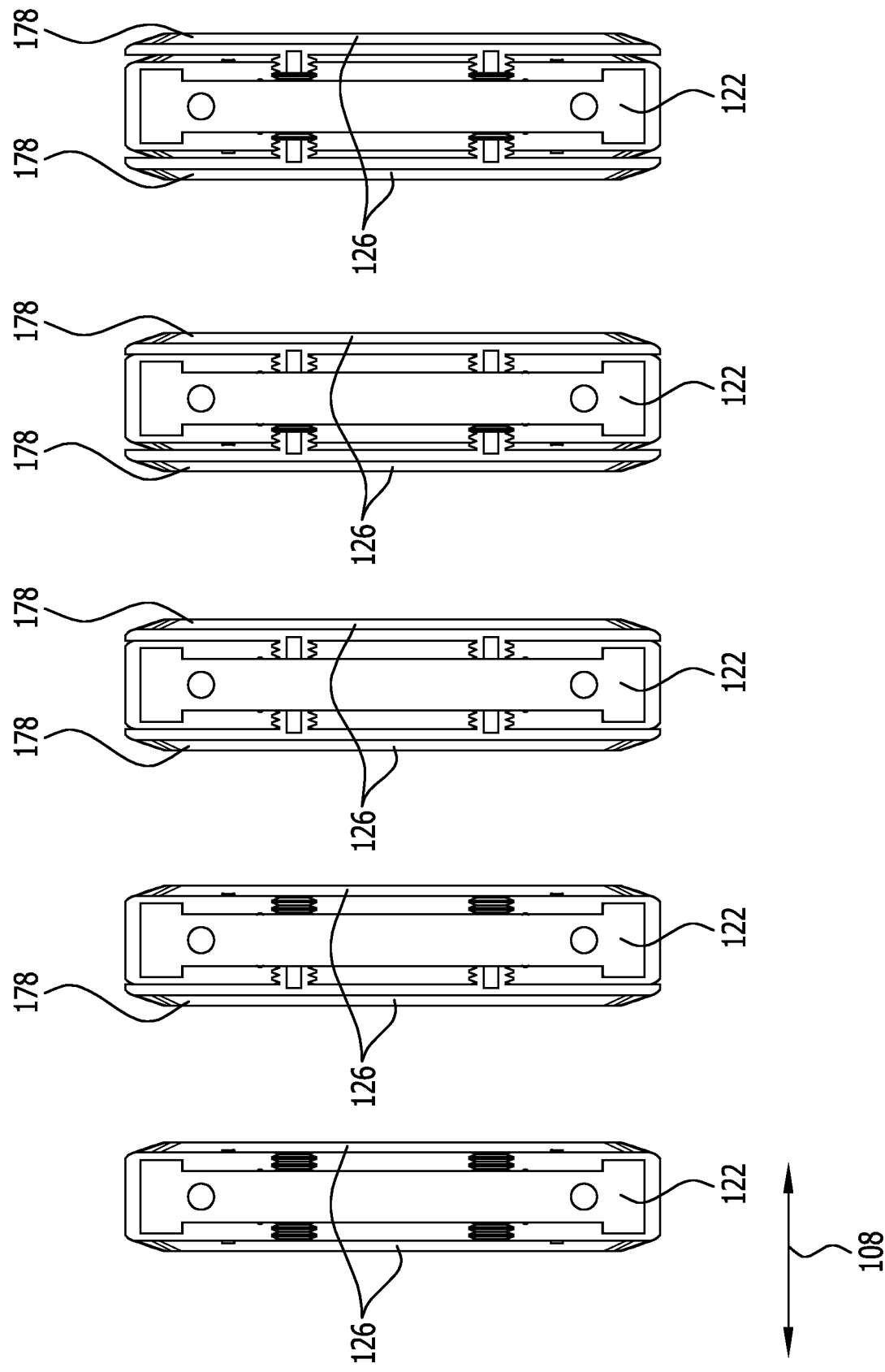

ADAPTER ELEMENT AND CONNECTING DEVICE

RELATED APPLICATION

This application is a continuation of international application No. PCT/EP2020/081610 filed on Nov. 10, 2020, and claims the benefit of German application No. 10 2019 217 467.1 filed on Nov. 12, 2019, which are incorporated herein by reference in their entirety and for all purposes.

FIELD OF DISCLOSURE

The present invention relates to the field of connecting elements used in furniture and mechanical engineering, for example. Connecting elements are used in particular to connect different components together, for example in order to manufacture a component composite. Furthermore, connecting elements can be used to attach a component to an object.

BACKGROUND

Various embodiments of connecting devices and connecting elements can be found, for example in DE 10 2014 101 158 A1, DE 10 2013 203 289 A1 or EP 2 142 042 B1.

To affix connecting elements, in particular those of the types disclosed in the above-mentioned publications, in a component a recess designed to complement at least part of the respective connecting element, in particular a receiving section, can be made in the component. This is a conceivable method especially for solid wood panels, MDF panels, etc. However, such a fixing of a connecting element is not readily possible for use in lightweight panels, for example in sandwich elements.

SUMMARY OF THE INVENTION

The object of the present invention is therefore to provide an adapter element for a connecting element of a connecting device, the adapter element allowing the connecting element to be fixed in a stable and reliable manner in a component, in particular a lightweight component.

According to the invention, this problem is solved by the adapter element according to claim 1.

The adapter element serves in particular to accommodate a connecting element of a connecting device. The adapter element can preferably be fixed in a component, in particular together with the connecting element accommodated in or on the adapter element.

The adapter element preferably comprises a receiving section for receiving a connecting element of a connecting device. The receiving section is formed by an interior space of the adapter element, in particular. In particular, at least part of the connecting element is arranged inside the adapter element when the connecting element is accommodated in the receiving section.

The adapter element preferably comprises a fixing section for fixing the adapter element in a component.

The fixing section is arranged in particular on one or more outer sides of the adapter element.

The fixing section is preferably arranged and/or formed on the outer sides of the adapter element, in particular the outer walls and/or side walls thereof, that face away from the receiving section.

By means of the adapter element, the connecting element can preferably be fixed not directly, but rather indirectly on and/or in the component.

It can be favorable if the adapter element can be fixed completely countersunk in the component.

As an alternative or in addition to this, it can be provided that the connecting element, in particular a main body of the connecting element, can be fixed completely inside the component.

The main body of the connecting element is preferably that part of the connecting element which serves to fix the connecting element in a component and/or in an adapter element.

In particular, the main body of the connecting element is that part of the connecting element which is not used to establish the connection with another connecting element, in particular a counterpart.

It can be favorable if the receiving section comprises one or more receiving recesses, in particular receiving grooves, for receiving one or more retaining projections of a connecting element.

As an alternative or in addition to this, it can be provided that the fixing section comprises one or more holding projections for fixing the adapter element in the component.

It can be favorable if the adapter element can be introduced into a receiving section of a component. For this purpose, the receiving section of the component is designed in particular to be essentially complementary to an outer shape of the adapter element. In particular, the receiving section of the component preferably has one or more receiving recesses, in particular receiving grooves, into which one or more retaining projections of the adapter element which are in particular non-self-tapping can be introduced, in particular pushed.

As an alternative or in addition to fixing the adapter element to the component by means of one or more, in particular non-self-tapping, retaining projections, the following fixing variants can be provided, for example:

Provisions can be made for the adapter element to be fixed or fixable to the component in a form-fitting and/or material-fitting and/or friction-fitting manner.

For example, a form-fitting anchoring can be provided by means of an undercut. Here, in particular, individual or multiple, in particular superimposed, movements can be provided for fixing the adapter element in the component. For example, a simple pushing in or plugging in can be provided.

As an alternative or in addition to this, combinations of movements, such as an insertion and an additional pushing, an insertion and an additional turning, or an insertion and an additional snapping in, can be provided.

Furthermore, it can be provided that the adapter element can be fixed on and/or in the component by means of an adhesive connection, for example. For this purpose, the attachment section of the adapter element can in particular be provided with a rough and/or structured surface and/or a surface provided with projections and/or undercuts.

It can be favorable if the adapter element, in particular the fixing section, comprises one or more channels through which a connecting material, in particular an adhesive, can be fed to one or more connecting surfaces, in particular adhesive surfaces, of the fixing section. For example, an opening for supplying the connecting material, in particular the adhesive, can be provided on an upper side of the adapter element, with the supplied connecting material, in particular the adhesive, being able to be fed to the one or more connecting surfaces of the fixing section by means of the one or more channels.

Furthermore, it can be provided that the adapter element has one or more receptacles for a connecting material, for example adhesive receptacles, in particular beads of glue. These receptacles are preferably filled and/or provided with the connecting material in a state which is ready for assembly of the adapter element.

In particular, by introducing the adapter element into the component and/or by means of a subsequent activation step, the connecting material can preferably be activated, in which case it comes out and/or is distributed in particular so that the connecting material creates a particularly materially bonded connection and/or form-fitting connection between the fixing section of the adapter element and the component.

In particular, the activation of the connecting material can be tearing open, bursting open, breaking open or other physical activation, in particular by introducing the adapter element into the component. As an alternative or in addition to this, chemical activation of the connecting material can be provided.

It can be advantageous if the connecting material is an adhesive. However, alternatively or additionally, it can also be provided that the connecting material is a polyurethane material, for example a foaming, hardening polyurethane material.

In a further embodiment of the adapter element, it can alternatively or additionally be provided that it is connected to the component and/or fixed on and/or in the same by means of a welding process, for example ultrasonic welding, by means of wood welding and/or by a cold melting process.

Alternatively or additionally, the adapter element can also be fastened to and/or in the component by means of one or more screws and/or dowels and/or rivet connections, etc.

In the embodiments of adapter elements explained below, the use of one or more retaining projections is provided, in particular for fixing the adapter element in a component. All of the above-mentioned options for fixing the adapter element to and/or in a component can be provided in all of the embodiments as an alternative or in addition to the one or more retaining projections.

For example, a combination of materially bonded connections using a connecting material, in particular an adhesive, can be provided in a configuration of a fixing section which has one or more holding projections.

It can be advantageous if the one or more receiving recesses, in particular receiving grooves, are curved in order to receive one or more retaining projections of a connecting element, in particular curved in the shape of a circular arc section.

For example, a retaining projection is formed in such a way that it extends essentially linearly along a plane.

The term "linear" is to be understood in particular as meaning that the holding projection extends along a main path and that a local transverse extent of the holding projection in all directions running perpendicular to the main path at preferably every local point along the main path is less than 20%, in particular less than 10%, preferably less than 5%, of a total length of the retaining projection along the main path.

The receiving section of the adapter element preferably comprises two, four, six or more than six receiving recesses, in particular receiving grooves, which are preferably arranged and/or formed at least approximately symmetric relative to one another, preferably with respect to a longitudinal center plane of the adapter element.

Two receiving recesses, in particular receiving grooves, are preferably provided in pairs and arranged in opposing walls, in particular inner walls, of the receiving section.

One or more receiving recesses, in particular receiving grooves, for receiving one or more retaining projections of a connecting element preferably extend on only one side or on both sides up to an upper side of the adapter element. Alternatively, it can also be provided that the one or more receiving recesses, in particular receiving grooves, for receiving one or more retaining projections of a connecting element extend completely within the receiving section and not to the upper side of the adapter element. In the first-mentioned cases, it is possible to insert a connecting element into the adapter element and/or remove it from the adapter element if the adapter element is already installed in the component. In the last-mentioned case, the connecting element can only be introduced into or removed from the adapter element in the un-installed state of the adapter element.

Provision can be made for the one or more retaining projections of the connecting element and/or the one or more retaining projections of the adapter element to be curved, in particular curved in the shape of a circular arc section.

The one or more retaining projections of the connecting element and/or the adapter element preferably extend along a circular arc section on one side or both sides at least approximately to the upper side of the connecting element, in particular of a main body of the connecting element, and/or to the upper side of the adapter element. Furthermore, an end of the respective retaining projection that is set back from the upper side can be provided on one side or on both sides.

It can be favorable if the adapter element comprises a plurality of receiving recesses, in particular receiving grooves, for receiving connecting elements of different types, for example different sizes, different functions, different geometries, etc.

The receiving recesses for the different types of connecting elements are arranged in particular at different depths in the receiving section of the adapter element.

The receiving recesses, in particular receiving grooves, preferably have radii of curvature that are identical or different from one another. In particular, it can be provided that the receiving recesses for the different types of connecting elements are arranged offset in parallel to one another, in particular along the depth direction and/or connecting direction.

It can be favorable if the one or more, in particular all, receiving recesses of the adapter element and/or one or more, in particular all, retaining projections of the adapter element run along one or more planes which, in particular, are aligned parallel to one another and/or perpendicular to an upper side of the adapter elements.

The upper side of the adapter element is in particular a side directed outwards from the component when the adapter element is in the installed state.

In particular, the upper side of the adapter element is that side of the adapter element which, in the installed state of the adapter element, is essentially flush with a side of the component in which the adapter element is arranged.

The upper side of the adapter element is preferably that side of the same in which one or more holding elements and/or spring elements of a connecting element arranged in the adapter element protrude from the adapter element in order to be in or to be brought into engagement with a suitable counterpart of a further connecting element of the connecting device.

Alternatively or additionally, the upper side of the adapter element is preferably that side of the adapter element through which one or more holding elements and/or spring elements, etc. of the connecting element arranged in the adapter element are accessible for a further connecting element, in particular for establishing a connection with the further connecting element of the connecting device.

It can be advantageous if the adapter element comprises one or more locking elements, in particular latching elements, for fixing a connecting element in the receiving section.

For example, two, four or six locking elements can be provided.

It can be provided that one or more retaining projections of the connecting element can be clamped, in particular latched, between one or more supporting projections of the adapter element and one or more locking elements of the adapter element, in particular for fixing the connecting element on the adapter element and/or in the adapter element.

The adapter element preferably comprises a main body which has an upper side running essentially along a plane and an in particular curved main surface. In particular, the main surface is curved in such a way that it initially extends away from the upper side and, due to the curvature, again extends to the upper side.

Two side surfaces, which in particular are aligned essentially perpendicular to the upper side, preferably additionally connect the main surface and the upper side.

In particular, the side surfaces are aligned parallel to one another.

In a plane running perpendicularly to the upper side and/or along a longitudinal direction of the adapter element, the main body of the adapter element preferably has a cross section that is essentially in the form of a segment of a circle.

The main body is preferably provided with one or more, in particular two, holding projections which are arranged in particular on the sides of the side surfaces facing the main surface and extend away from the side surfaces at least approximately perpendicularly. The retaining projections are in particular curved in the form of arcs of a circle.

It can be favorable if the main surface and/or the upper side and/or one or both side surfaces of the main body each have one or more recesses. These can be used in particular to hold connecting material, for example adhesive. The connecting material can in particular be a connecting material for connecting the adapter element to a component. In this case, the receiving of the connecting material by means of the one or more recesses provides in particular for the optimized form-fitting and/or material-fitting connection between the component and the adapter element.

Alternatively or additionally, one or more recesses can be provided in the upper side, the main surface and/or one or more side surfaces in order to be able to absorb excess connecting material, in particular adhesive, when connecting, in particular gluing, components to be connected to one another.

Preferably, the main surface has an opening through which a connecting element can be introduced into the adapter element.

As an alternative or in addition to this, it can be provided that the upper side has an opening through which a connecting element can be introduced into the adapter element.

It can be provided that the adapter element, in particular an opening in an upper side and/or in a main surface of the adapter element, is designed such that a connecting element can be introduced into the adapter element both through the main surface and through the upper side. As an alternative to this, it can be provided that the connecting element can only be introduced into the adapter element through an opening in the main surface or only through an opening in the upper side of the adapter element.

In a further configuration of the adapter element, which will be discussed in more detail below, it can also be provided that none of the openings in the upper side and/or the main surface are suitable for introducing a connecting element into the adapter element, but rather that when the adapter element is installed the connecting element is introduced between two or more parts of the adapter element.

A longitudinal direction of the adapter element preferably extends parallel to the side surfaces and parallel to the upper side of the adapter element.

A depth direction of the adapter element preferably extends perpendicular to the upper side of the adapter element.

In particular, a depth direction is a connection direction along which, for example, the tensile forces connecting the components to one another act when the connection device is in a connected state.

A thickness direction of the adapter element preferably extends perpendicularly to the side surfaces of the adapter element and/or parallel to the upper side of the adapter element.

It can be advantageous if the adapter element comprises a one-piece main body which is designed as an injection-molded plastic component, for example.

A one-piece main body is manufactured or can be manufactured in particular in a single method step and/or in one piece.

In particular, the preferably one-piece main body comprises and/or forms the receiving section and/or the fixing section and/or the upper side and/or the main surface and/or the side surfaces and/or one or more retaining projections and/or one or more receiving recesses, in particular receiving grooves.

As an alternative to a one-piece main body, it can be provided that the adapter element comprises a main body which comprises a plurality of parts which can be connected and/or are connected to one another, in particular a plurality of parts which can be detachably connected and/or are connected to one another, with one or more, in particular all, of the parts being preferably designed as injection molded plastic components.

Each of these parts is preferably formed in one piece.

Provision can be made for the main body to be manufactured or to be manufacturable from two parts which are structurally identical to one another and/or are identical in terms of shape.

In particular, it can be provided that the main body can be manufactured or is manufacturable from two identical parts.

The parts for manufacturing the main body can be plugged into one another and/or locked together, for example.

In particular, the parts for manufacturing the main body can be releasably connected to one another.

It can be advantageous if the parts for manufacturing the main body can be connected to one another by means of a tongue and groove connection.

In the installed state of the main body, the parts for manufacturing the main body adjoin one another, in particular along a longitudinal center plane of the adapter element which is arranged centrally in particular perpendicular to the thickness direction of the adapter element.

The longitudinal center plane of the adapter element is in particular aligned parallel to side faces of the adapter element and/or perpendicular to an upper side of the adapter element.

In particular, the parts for manufacturing the main body adjoin one another in the receiving section of the adapter element.

One or more connecting elements can preferably be introduced between the two or more parts to manufacture the main body in order to fix the one or more connecting elements on and/or in the adapter element, in particular on and/or in the main body of the adapter element, for example to fix them in a form-fitting manner.

It can be advantageous if adapter elements with an overall different extent in the thickness direction can be manufactured from a plurality of parts of different thicknesses, i.e. parts which extend to different extents in the direction of thickness.

For example, by using a set of parts with different thicknesses for manufacturing the main body by suitably combining them, a large number of adapter elements which differ from one another in terms of their extent in the thickness direction can be manufactured.

The one or more connecting elements are accommodated or can be accommodated in particular in a form-fitting manner in all spatial directions between the parts for manufacturing the main body.

It can be favorable if the adapter element has one or more passage openings in at least one side surface thereof through which the receiving section and/or a connecting element received in the receiving section can be accessed.

In particular, provision can be made for one or more passage openings to be provided in each of the two side faces, so that accessibility is ensured regardless of an orientation of the adapter element during installation of the same and/or during installation of the connecting element.

In particular, a tool can be introduced through the one or more passage openings, for example to actuate a movable holding element of the connecting element, to the extent that it can be arranged in the adapter element, for example to bring it from an open position to a closed position or vice versa.

It can be favorable if the adapter element is designed in several parts.

In this case, for example, the receiving section can be formed by one or more parts of the adapter element.

In particular, the receiving section is formed entirely by only one one-piece part of a plurality of adapter element parts.

The adapter element comprises in particular a preferably one-piece main body which forms or comprises a part of the receiving section or the complete receiving section.

One or more optional further parts of the adapter element, which are particularly optionally provided in addition to the main body, are preferably one or more side parts, which can be or are arranged adjacent to the main body, in particular in the thickness direction.

A side part is referred to herein in the singular and in the plural. In principle, in all variants of the adapter element, only a single side part or also two side parts can be provided. In addition, it is conceivable that further side parts can be arranged on the side parts themselves in order to allow further extensions of the adapter element along the thickness direction.

The main body preferably comprises one or more retaining projections for fixing the same in a component.

The side parts preferably each have one or more retaining projections.

The main body can preferably be fixed in one component by itself and/or in combination with a side part and/or in combination with two or more side parts, for example by means of holding projections.

The adapter element preferably comprises one or more connection areas.

For example, one or more connecting areas are arranged and/or formed on each outer wall bordering the main body in the thickness direction (or only on one of these outer walls), the connecting areas able to be brought into engagement with one or more connecting areas of a side part which are designed to be complementary thereto at least in sections.

For example, each side part comprises one or more spacer elements which can be introduced into one or more spacer element receptacles of the main body which are at least partially designed to be complementary to a spacer element.

In particular, one or more grid structures are formed by means of the spacer elements and/or the spacer element receptacles, the side parts thereby preferably being able to be fixed in different positions and/or distances from the main body relative to the same.

In particular, it can be provided that one or more retaining projections of the respective side part can be fixed at different distances from the main body by means of the grid structure.

It can be favorable if one or more spacer element receptacles and/or one or more spacer elements each have one or more spacer projections and/or one or more spacer recesses.

The spacer projections and/or spacer recesses serve in particular to form a grid structure.

The distancing projections are preferably designed and/or arranged complementary to the distancing recesses, at least in sections.

It can be advantageous if the at least one spacer element and/or the at least one spacer element receptacle each includes one or more spacer projections and/or one or more spacer recesses.

It can be provided that the spacer element is substantially U-shaped, for example, and can be introduced into a spacer element receptacle complementary thereto in the main body.

An adapter element can preferably be provided with one or more positioning grooves, in particular independently of the rest of its configuration.

Such a positioning groove can in particular be brought into engagement with a positioning projection of a connecting element in order to be able to fix the connecting element in a desired preferred position in the receiving section of the adapter element.

Both the main body and the side parts can in particular be manufactured and/or formed in one piece. For example, the manufacture of the main body and/or one or more side parts can be provided in an injection molding process, in particular a plastic injection molding process.

As an alternative or in addition to the above statements, it can be provided that the spacer elements are or can be fixed resiliently in the spacer element receptacles.

One or more spacer springs are arranged in particular as compression springs between the main body and a side part, for example in such a way that the spacer springs in particular push the side part outwards away from the main body in a thickness direction. Such a configuration of an adapter element can be used in particular to fix connecting elements in components with varying thicknesses of the receiving sections without always having to set an exact extension in the thickness direction in advance for the adapter element.

Since the spacer spring preferably acts in the thickness direction and thus perpendicular to a pull-out direction (depth direction), the at least one spacer spring preferably does not have to apply any holding forces to hold the components in the installed state of the adapter element together with a connecting element accommodated therein for connecting components to one another. Rather, the at least one spacer spring preferably only has to ensure reliable anchoring of the holding projections in the supporting projections of the respective component.

In order to avoid undesired separation of the side part from the main body, one or more spacer elements are, for example, T-shaped in cross section and/or reach behind the respective spacer element receptacle, preferably in the thickness direction.

A bottom side of the adapter element can be provided with one or more flow channels, for example, which can contribute to the form-fitting connection when fixing the components and/or when fixing an adapter element in a component and/or can absorb excess connecting material.

It can be favorable if the adapter element and/or a connecting element to be arranged therein has one or more insertion openings which extend in particular in the depth direction through the adapter element and/or the connecting element and/or which enable the introduction of connecting material, in particular adhesive, into an area on the bottom side of the adapter element from an outside and/or upper side of the adapter element.

In particular, the adapter element can have one or more retaining elements.

A retaining element can be a retaining projection, for example.

A retaining element is preferably used to anchor the adapter element to a component designed as a lightweight board.

For example, it can be provided that a retaining element reaches under a cover layer of a component and/or extends into a core of a component.

The retaining element is preferably in the form of a linear or at least approximately linear projection, in particular in order to enable it to lie flat on and/or below a flat cover layer of a component.

It can be favorable if the adapter element has two side walls and a bottom wall connecting the two side walls to one another.

The two side walls and the bottom wall preferably surround the receiving section for receiving the connecting element.

It can be advantageous if one or both side walls are only connected to the bottom wall in two opposite end areas, in particular end areas opposite one another with respect to a longitudinal direction of the adapter element. A middle area of the respective side wall arranged between the two end areas is hereby designed to be preferably elastically flexible and/or movable, in particular relative to the bottom wall.

It can be favorable if one or more retaining elements are arranged in the middle area. In particular, one or more retaining elements preferably extend outwards from a respective side wall side surface facing away from the receiving section.

It can be favorable if one or more retaining elements each have one or more flank areas which form sections of the respective retaining element that are flattened towards one or more end areas of a side wall of the main body. This can preferably make it easier to slide the adapter element into a component, in particular to prevent or at least minimize damage to a cover layer of the component.

One or more retaining elements can be anchored, in particular resiliently and/or by inserting a connecting element into the receiving section in the component; in particular it can be introduced into a core of the component and/or can be fixed, for example clamped, underneath a cover layer of the component.

The adapter element is particularly suitable for use in a connecting device which is particularly suitable for connecting furniture and/or machine parts and/or for fixing a component to an object.

The connecting device preferably comprises at least one connecting element and at least one adapter element, for example an adapter element according to the invention.

In particular, the connecting elements described in the documents mentioned at the outset can be provided as the connecting element.

Explicit reference is therefore made to the relevant description and its content is hereby made the subject matter of the present application in its entirety by reference.

It can be advantageous if the receiving section of the at least one adapter element is designed to be complementary to a main body of the at least one connecting element, at least in sections.

The main body of the at least one connecting element is in particular the part of the connecting element to be arranged inside the adapter element.

In particular, it can be provided that the cavity created in the adapter element by the receiving section is at least approximately complementary to an outer contour of the connecting element, in particular an outer contour of the main body of the connecting element.

The at least one connecting element can preferably be fixed or is fixed in a form-fitting manner in the adapter element in one, two or all three spatial directions.

A main body of the at least one connecting element can preferably be accommodated or is accommodated at least approximately completely in the receiving section of the at least one adapter element.

In particular, the main body of the at least one connecting element can be accommodated or is accommodated in the receiving section of the at least one adapter element in a preferably completely countersunk fashion.

By means of the adapter element according to the invention, it is preferably possible to also use a connecting element in areas in which it has hitherto not been possible to satisfactorily attach the element to a component.

For example, the use of an adapter element enables the use of connecting elements in lightweight components of different thicknesses.

For this purpose, in particular, adapter elements adapted to the respective thickness of the lightweight component are provided, in particular with different extensions along the thickness direction.

The adapter elements extend in particular far enough along the thickness direction that it is possible to fix the respective adapter element in the cover layers of a lightweight component designed, for example, as a sandwich element. The core, which is often insufficiently stable in lightweight components, is then irrelevant to the stable fixing of the connecting element since the connecting element can be fixed stably and reliably to the cover layers by means of the adapter element.

The present invention also relates to a set of adapter elements for accommodating connecting elements of one or more connection devices, the set comprising several types of adapter elements.

The several types of adapter elements are preferably different
a) with regard to their dimensioning, in particular with regard to their extension in a thickness direction and/or a depth direction and/or a longitudinal direction; and/or
b) with regard to the design of the respective receiving section, in particular with regard to the number and/or the shape and/or the length and/or the radius of curvature of the respective at least one receiving groove; and or
c) with regard to the design of the respective fixing section, in particular with regard to the shape and/or the fixing method.

It can be favorable if several types of adapter elements, in particular all types of adapter elements of a set of adapter elements, have receiving sections that are at least identically shaped in such a way that one or more types of connecting elements can be received in each of the several types of adapter elements.

In particular, the adapter element comprises two outer walls, which in particular form the side surfaces of the adapter element.

As an alternative or in addition to this, it can be provided that the adapter element comprises two inner walls, which in particular border the receiving section.

Connecting struts, connecting walls, stiffening elements and/or ribs are preferably arranged and/or formed between the outer walls and the inner walls, the struts, walls stiffening elements and/or ribs connecting the outer walls to the inner walls and keeping them at a distance from one another.

For differently-dimensioned adapter elements, in particular for adapter elements which have different extents in the direction of thickness, outer walls of different thicknesses and/or inner walls of different thicknesses and/or differently dimensioned connecting struts, connecting walls, stiffening elements and/or ribs are provided between the outer walls and the inner walls.

In particular, one or more component composites can be manufactured by means of the adapter element according to the invention, the connecting device according to the invention and/or the set of adapter elements according to the invention.

The present invention therefore also relates to a component composite, in particular a piece of furniture or a machine.

The component composite preferably comprises a plurality of components which are connected to one another in particular by means of at least one connecting device, in particular a connecting device according to the invention.

At least one of the components of the component composite is preferably designed as a lightweight component, in particular as a sandwich element.

At least one connecting element of the at least one connecting device is preferably fixed on and/or in the at least one component by means of at least one adapter element, in particular at least one adapter element according to the invention.

The present invention also relates to a method for establishing a connection between two components and/or for fixing a component to an object.

In this regard, the object of the invention is to provide a method by means of which a stable connection between two components can be manufactured easily or a component can be firmly fixed to an object.

According to the invention, this problem is solved by the features of the independent method claim.

In the method, an adapter element is preferably selected from a set of adapter elements. The set of adapter elements is in particular a set of adapter elements according to the invention.

When making the selection, particular consideration is given to an overall material thickness and/or a core material thickness and/or cover layer thickness of a component in which the adapter element and ultimately a connecting element are to be fixed.

Furthermore, in the method, a connecting element of a connecting device is preferably fixed on and/or in the selected adapter element.

In addition, the adapter element is preferably introduced into a receiving section that is prefabricated in the component.

The connecting element can be arranged in the adapter element before the adapter element is introduced into the component. As an alternative to this, it can be provided that first the adapter element is introduced into the component and then the connecting element is fixed in the adapter element.

Finally, the connection between the two components is preferably established by connecting the connecting element fixed on and/or in the adapter element to a further connecting element of the connecting device or the object is fixed to the component by connecting the connecting element fixed on and/or in the adapter element to the object.

The method preferably has one or more of the features and/or advantages described in connection with the products according to the invention.

Furthermore, the products described preferably have one or more of the features and/or advantages described in connection with the method according to the invention.

Finally, preferably all products also have the features and/or advantages described in connection with the respective other products.

In particular, a component composite according to the invention can be manufactured with the method according to the invention.

All items, sections, objects, parts of objects, etc. mentioned in this description and the appended claims, which are listed in the singular, can optionally, in particular in further embodiments, be provided multiple times.

Furthermore, optionally, in particular in further embodiments, all objects, sections, objects, parts of objects, etc. mentioned in this description and the appended claims, which are listed in the plural, can only be provided once.

Further features and/or advantages of the invention are the subject matter of the following description and the drawings illustrating embodiments.

BRIEF DESCRIPTION OF THE DRAWINGS

FIG. 4 a schematic vertical longitudinal section through the adapter element and a connecting element to be arranged therein;

FIG. 5 a schematic representation of the adapter element and the connecting element corresponding to FIG. 4, the connecting element being fixed in the adapter element;

FIG. 17 various possible combinations of a main body and one or more side parts for the optional provision of adapter elements with different extensions in the thickness direction;

The same or functionally equivalent elements are provided with the same reference signs in all figures.

DETAILED DESCRIPTION OF THE DRAWINGS

Figure 1:
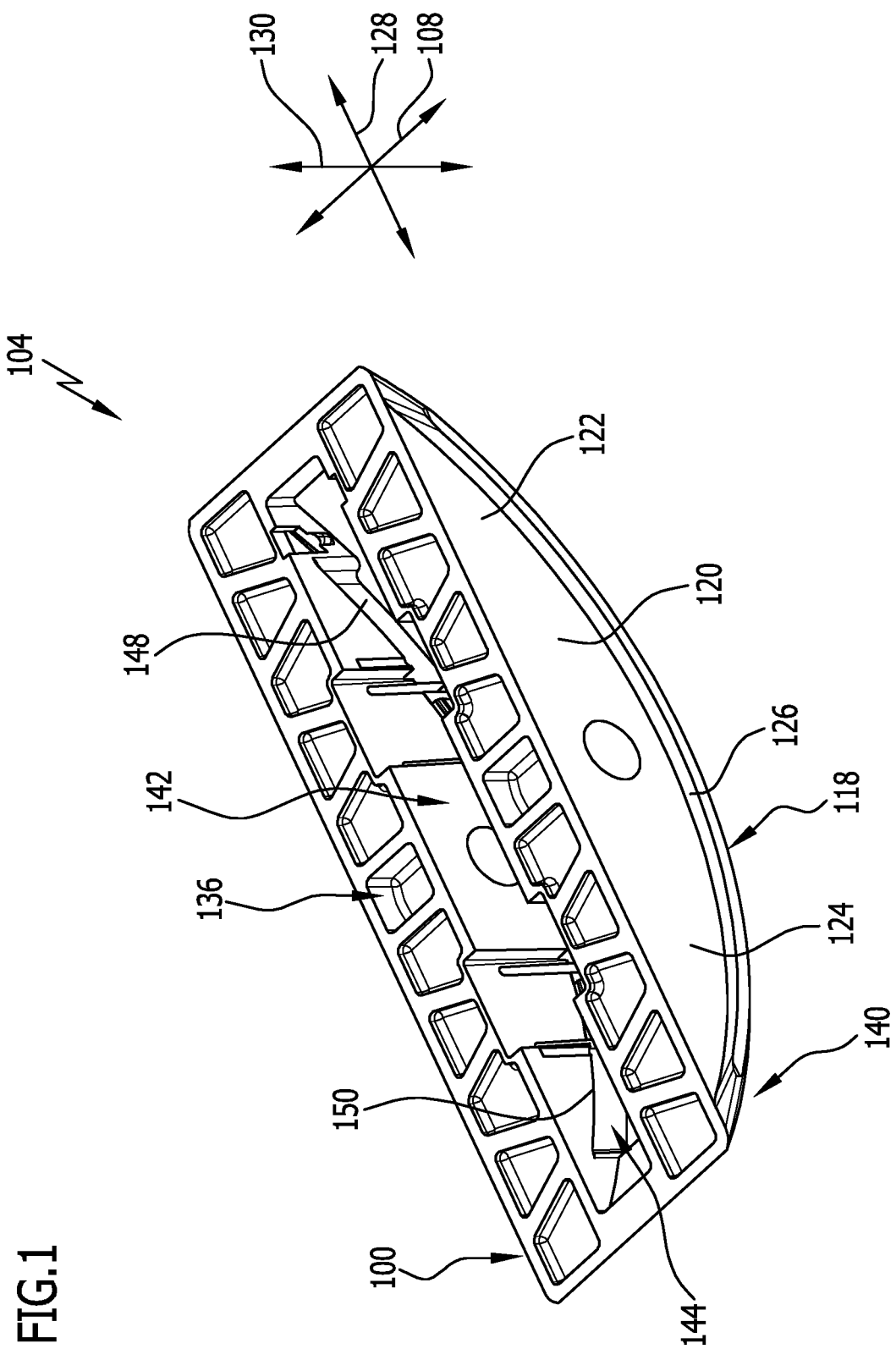
FIG. 1 a schematic perspective view of a first embodiment of an adapter element in which a connecting element can be inserted through a main surface of the adapter element.
Figure 2:
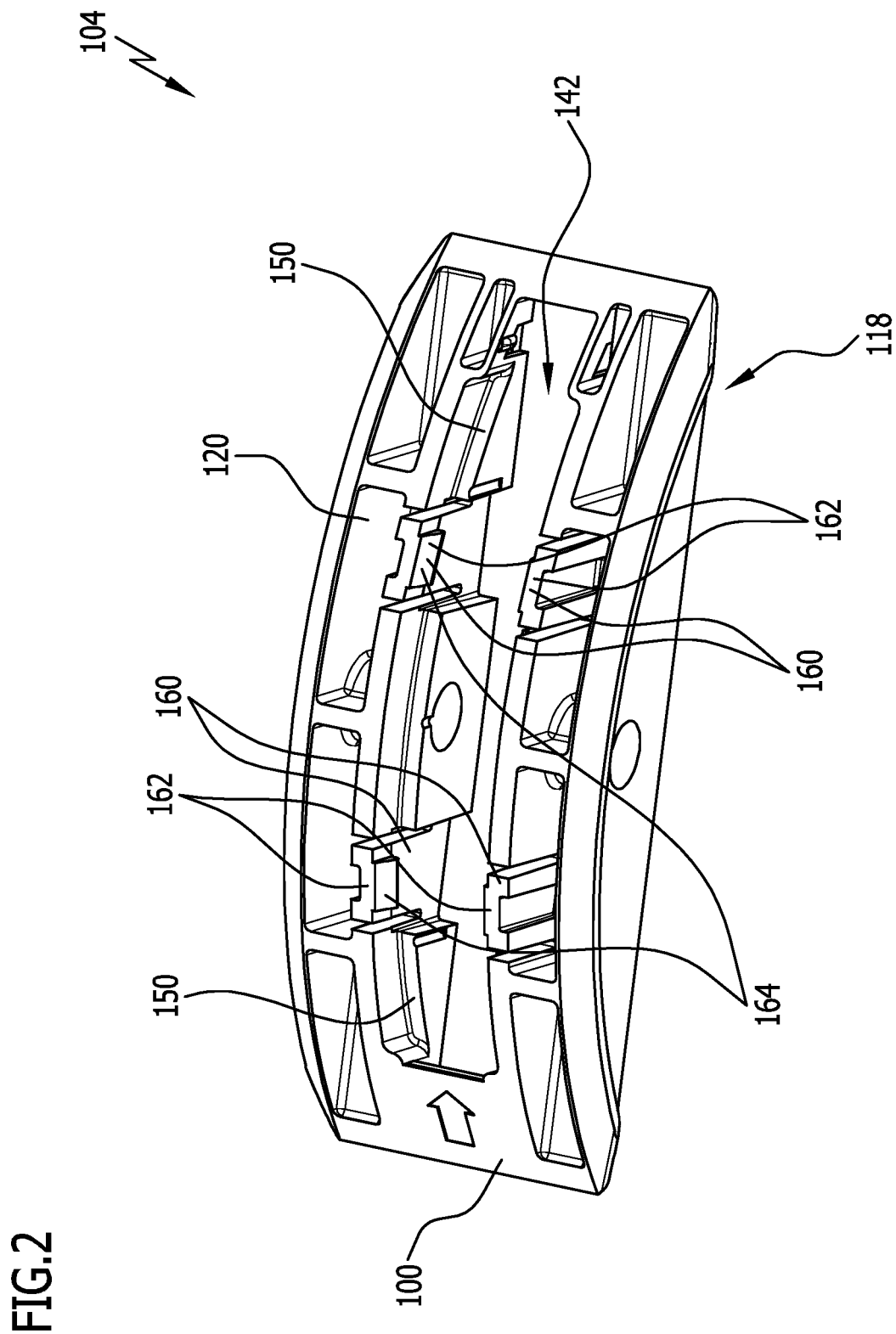
FIG. 2 a further schematic perspective representation of the adapter element from FIG. 1.
Figure 3:
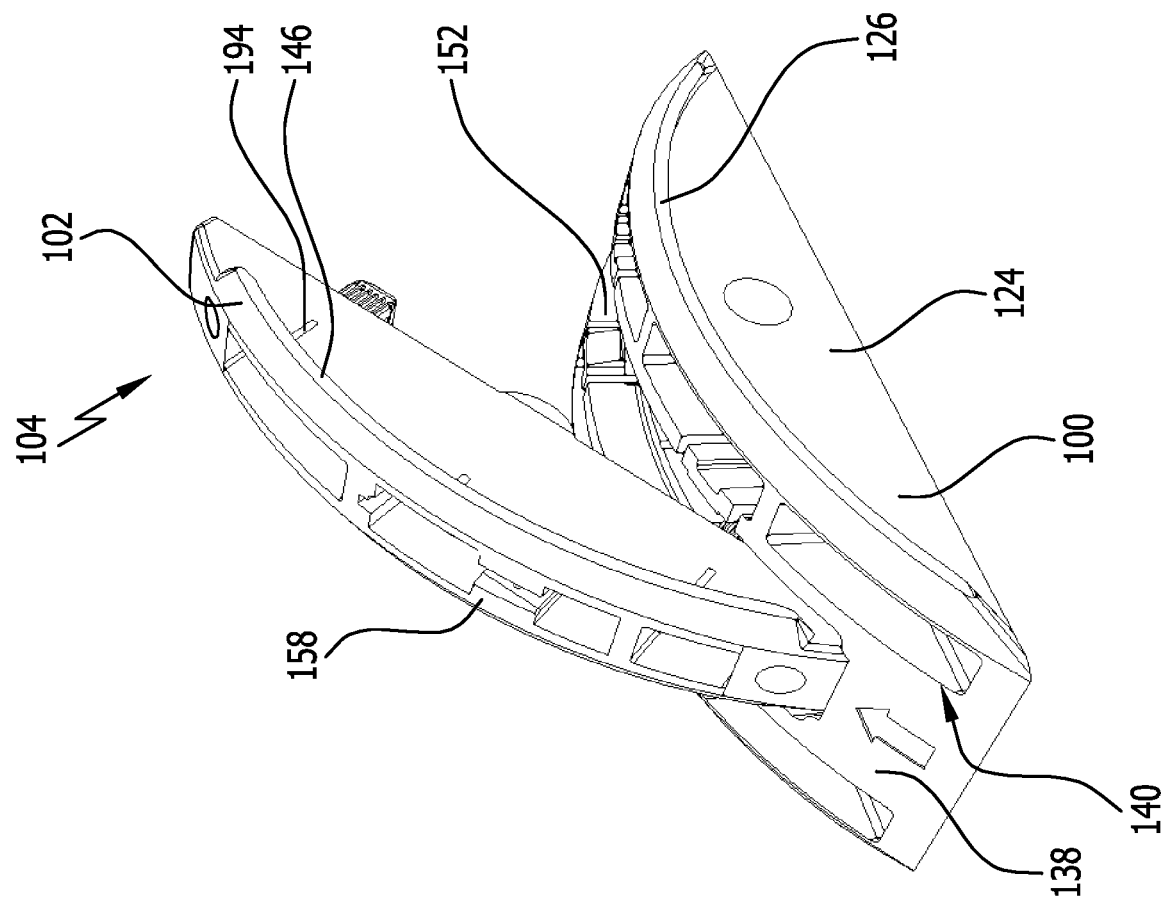
FIG. 3 a schematic perspective representation of the adapter element from FIG. 1, wherein a connecting element is inserted into the adapter element.

A first embodiment shown in FIGS. 1 to 5 of an adapter element denoted as a whole by 100 serves in particular to accommodate a connecting element 102, shown for example in FIGS. 3 to 5 of a connecting device denoted as a whole by 104.

Figure 6:
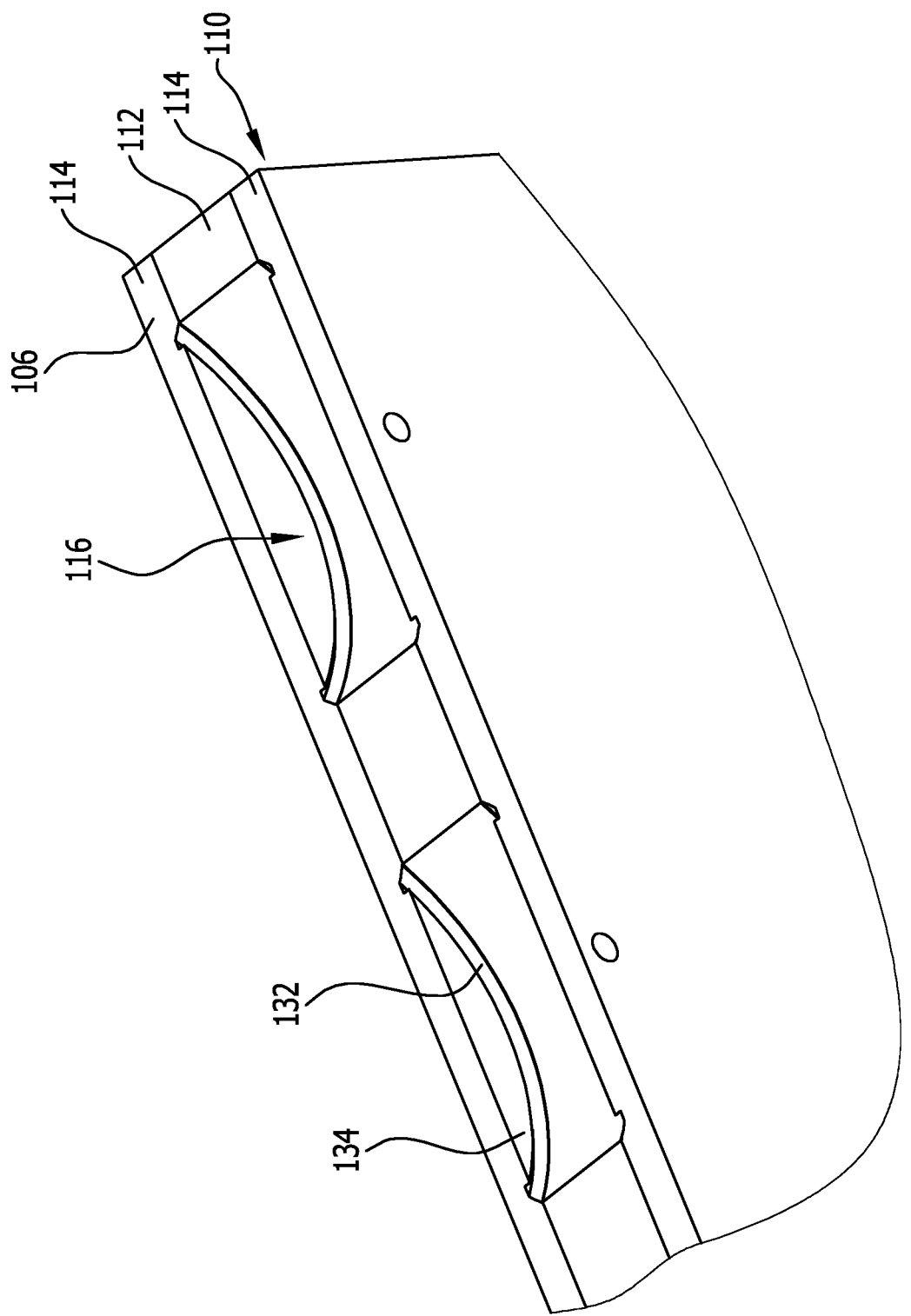
FIG. 6 a schematic perspective representation of a component designed as a sandwich element, for example, which is provided with receiving sections for receiving two adapter elements together with connecting elements that may be arranged therein.
Figure 7:
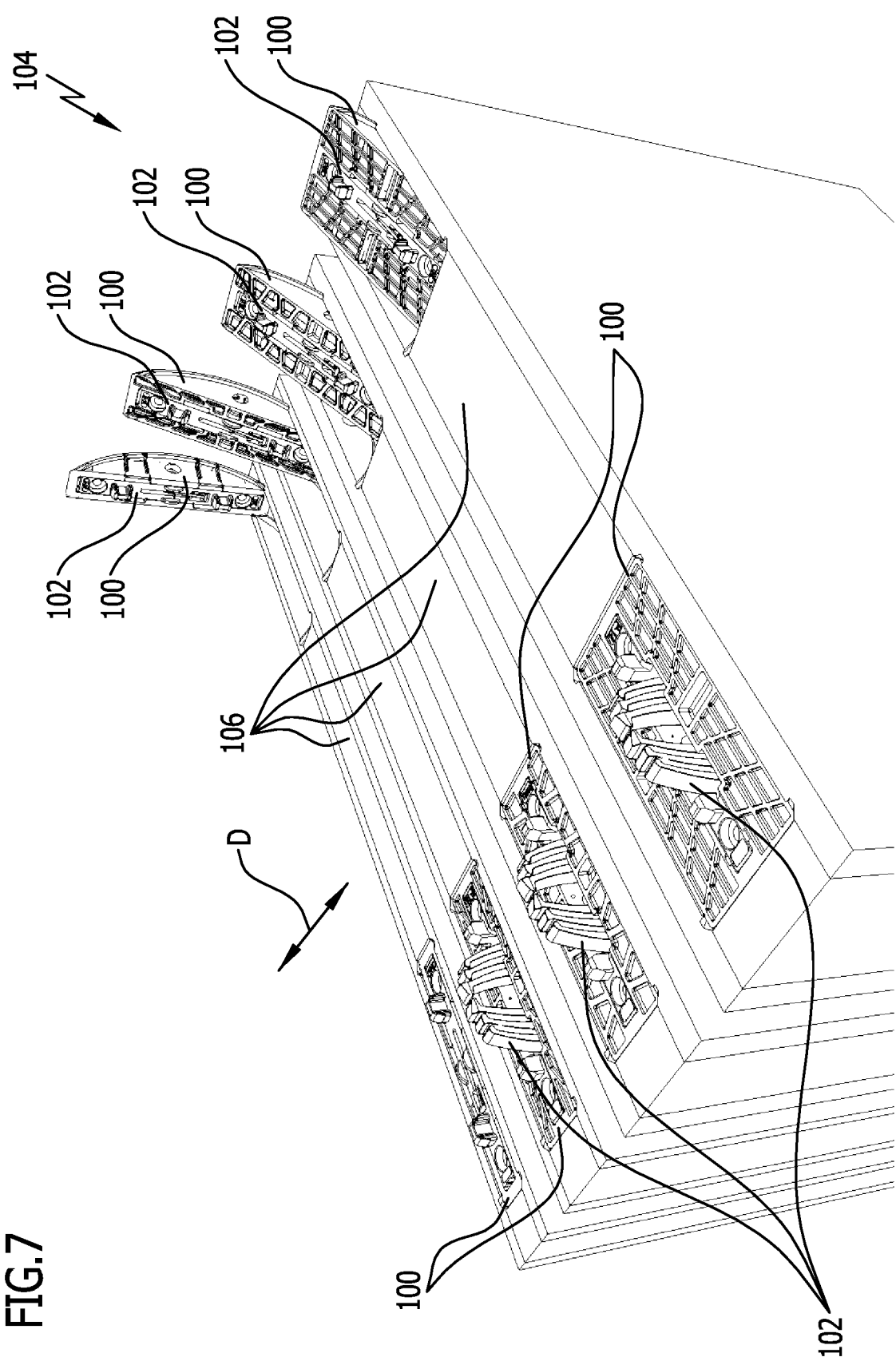
FIG. 7 a schematic perspective view of four components which have different material thicknesses and are provided with differently dimensioned adapter elements for fixing connecting elements.

A connecting element 102 can be arranged in particular in a component 106 by means of the adapter element 100 in order ultimately to connect this component 106 to a further component 106, which is also provided with one or more connecting elements 102, for example (see in particular FIGS. 6 and 7).

The starting point for using the adapter element 100 is the existence of the connecting elements 102, which are particularly suitable for fixing in solid wood material, MDF panels, etc. However, such a material is often available in comparatively thin material thicknesses of, for example, 15 mm or 18 mm. The connecting elements 102 correspondingly have a comparatively small extent in a thickness direction 108, which in the installed state of the respective connecting element 102 corresponds to a direction in which the material thickness of the component 106 is determined.

For example, in components 106 embodied as a sandwich element 110, the structural design of the component 106 can, under certain circumstances, result in the connecting element 102 being fixed insufficiently in the component 106.

In particular when the component 106 has a core 112 which has a low density and/or rigidity and/or load-bearing capacity in comparison to two cover layers 114 bordering the core 112, a connecting element 102 may possibly only be fixed insufficiently in the component 106.

An adapter element 100 is therefore preferably provided, by means of which the connecting element 102 can be fixed indirectly in the component 106.

The adapter element 100 is preferably adapted to the extent of the component 106, in particular to an overall thickness D, its material thickness and/or a thickness of the core 112 and/or a thickness of the cover layers 114.

The adapter element 100 preferably extends beyond a thickness of the core 112 from one of the cover layers 114 to the other of the cover layers 114.

In particular, the adapter element 100 can preferably be fixed or is fixed to the cover layers 114 lying opposite one another with respect to the core 112, so that the adapter element 100 can be fixed reliably and stably to the component 106 regardless of the material properties of the core 112. Correspondingly, a connecting element 102 arranged stably and reliably on the adapter element 100 can also be stably fixed in the component 106.

For this purpose, the component 106 is provided in particular with one or more receiving sections 116 in which the one or more adapter elements 100 can be arranged.

Each receiving section 116 is preferably designed at least in sections to complement the outer shape of the respective adapter element 100, in particular to ensure that the adapter element 100 is reliably fixed, for example a form-fitting fixing in at least one direction, in the component 106.

The concrete details of different embodiments of adapter elements 100 are discussed in more detail below.

In the embodiment of an adapter element 100 shown in FIGS. 1 to 5, this includes a fixing section 118, by means of which the adapter element 100 can be fixed in a component 106.

The fixing section 118 is arranged and/or formed in particular on the outer walls 120 of a main body 122 of the adapter element.

For example, two opposite outer walls 120 of the main body 122 are provided which form side faces 124 of the adapter element 100 and have one or more retaining projections 126.

A retaining projection 126 is, for example, a projection protruding away from the outer wall 120, in particular the side surface 124.

A retaining projection 126 is designed, for example, so that it extends substantially linearly along a plane.

As an alternative or in addition to this, it can be provided that the holding projection 126 is curved, in particular curved in the shape of a circular arc section.

Two retaining projections 126 are preferably provided which are arranged on mutually opposite side surfaces 124 of the main body 122 and protrude away from one another.

Retaining projections 126 are preferably designed to be at least approximately mirror-symmetrical to one another, in particular with respect to a longitudinal center plane of adapter element 100 extending in a longitudinal direction 128 and in a depth direction 130.

The adapter element 100 can in particular be introduced into a receiving section 116 which is provided with receiving grooves 132 which are designed to be essentially complementary to the holding projections 126.

The receiving grooves 132 extend in particular along the thickness direction 108 into the respective cover layer 114 of the component 106, so that support projections 134 for supporting the retaining projections 126 of the adapter element 100 are formed in the cover layers 114 (see in particular FIGS. 6 and 7).

The main body 122 of the adapter element 100 also includes a upper side 136 connecting the two side surfaces 124 to one another and a main surface 138 opposite the upper side 136, the main surface in particular forming or including a bottom side 140 of the main body 122.

The main surface 138 and/or the bottom side 140 are in particular curved in design, for example curved in the shape of a cylinder jacket section.

The main surface and/or the bottom side 140 preferably adjoins the upper side 136 at two ends or sides due to the curvature.

The adapter element 100 preferably comprises a receiving section 142 for receiving a connecting element 102.

In terms of function, receiving section 142 for receiving connecting element 102 preferably substantially corresponds to the function of receiving section 116 in component 106 for receiving adapter element 100.

The receiving section 142 of the adapter element 100 is formed in particular within the main body 122 of the adapter element 100.

In particular, the main body 122 surrounds a cavity 144 in which a connecting element 102 can be accommodated and/or fixed at least in sections.

For this purpose, the hollow space 144 is preferably designed at least in sections to be substantially complementary to at least one section of the connecting element 102.

In particular, the cavity 144 is preferably at least partially designed to be complementary to a basic shape, with regard to which several connecting elements 102 of different types match one another.

For example, the cavity 144 of the adapter element 100 is designed to complement one or more retaining projections 146 of one or more connecting elements 102, at least in sections.

The receiving section 142 of the adapter element 100 preferably includes one or more receiving grooves 148 which serve in particular to receive retaining projections 146 of one or more connecting elements 102.

The receiving grooves 148 of the adapter element 100 for fixing the retaining projections 146 of the connecting element 102 thus correspond functionally to the receiving grooves 132 of the receiving sections 116 of the component 106 for receiving the retaining projections 126 of the adapter element 100.

All features and/or advantages of the receiving grooves 148 of the adapter element 100 for fixing the retaining projections 146 of the connecting element 102 can preferably be provided individually or in any combination in the receiving grooves 132 of the receiving sections 116 of the component 106 and vice versa.

Furthermore, preferably all features and/or advantages of the holding projections 146 of the connecting element 102 can also be provided individually or in any combination with the holding projections 126 of the adapter element 100 and vice versa.

One or more receiving grooves 148 in receiving section 142 of adapter element 100 preferably extend along a plane which is aligned in particular parallel to one or more side faces 124 and/or perpendicular to thickness direction 108 of adapter element 100.

In particular, two opposing receiving grooves 148 are provided, which in particular extend away from one another and/or are designed at least approximately mirror-symmetrically to one another with respect to a longitudinal center plane of the adapter element 100 running in the longitudinal direction 128 and the depth direction 130.

The receiving grooves 148 are in particular linear and/or curved, for example curved in the shape of a circular arc section.

Due to the one or more receiving grooves 148, at least one supporting projection 150 for supporting one or more holding projections 146 of a connecting element 102 is preferably formed in the receiving section 142.

When the adapter element 100 is in a state of use, in which it is used, for example, to connect two components 106, the adapter element 100 is preferably fixed in a component 106 in such a way that the upper side 136 of the adapter element 100 points in the direction of the further component 106.

The upper side 136 of the adapter element 100 is therefore that side of the adapter element 100 on which the connecting element 102 fixed on the adapter element 100 and/or in the adapter element 100 acts to establish the connection between the components 106 and/or is accessible in order to establish the connection for another connecting element 102, for example.

In one embodiment (to be described below), the connecting element 102 can be introduced into the receiving section 142 from the upper side 136, for example.

In the embodiment shown in FIGS. 1 to 5, on the other hand, it is provided that the connecting element 102 can be introduced into the receiving section 142 of the adapter element 100 from the bottom side 140, in particular through the main surface 138.

An opening 152 provided for this purpose in the bottom side 140 and/or the main surface 138 in the main body 122 can be adapted for this purpose, for example adapted to the shape of the connecting element 102 in such a way that the connecting element 102 can be pushed into the adapter element 100 along the depth direction 130 without any required rotation.

On the other hand, it can be advantageous if the adapter element 100 has a pivoting-in section 154, by means of which a connecting element 102 can be introduced into the receiving section 142 of the adapter element 100 in a simplified manner.

The pivoting-in section 154 comprises in particular a support section 156 on which a connecting element 102 can be placed and/or is supported in order to introduce this into the receiving section 142, for example via a pivoting movement, in particular with a reduced force requirement.

The support section 156 serves in particular to support a connecting element 102 on one or more retaining projections 146 of the connecting element 102, a main surface 158 of the connecting element 102 at the same time preferably being supported, and pivoting into the receiving section 142 being possible with preferably very little effort by suitably rotating the connecting element 102

The pivoting-in section 154 can be particularly advantageous if the connecting element 102 is to be connected to the adapter element 100 in a particularly stable manner, and to this end one or more locking elements 160, for example latching elements 162, have to be overcome using high spring forces, for example.

As can be seen in particular from FIGS. 2 and 5, one or more locking elements 160, in particular locking elements 162, are preferably provided in the adapter element 100 in such a way that they reach behind the connecting element 102 in the depth direction 130 when it is in an installed state.

In particular, latching projections 164 are arranged on a side of receiving groove 148 opposite the respective supporting projection 150, so that, for example, retaining projections 146 of connecting element 102 can be accommodated, for example clamped, between supporting projections 150 and locking elements 160, in particular latching elements 162, and thus can be fixed along depth direction 130 in a form-fitting manner.

The embodiment of the adapter element 100 illustrated in FIGS. 1 to 5 also preferably has one or more passage openings 166 which are arranged and/or designed in one or both outer walls 120 and/or both side surfaces 124, for example.

The receiving section 142 is preferably accessible for at least one tool through the one or more passage openings 166.

Figure 13:
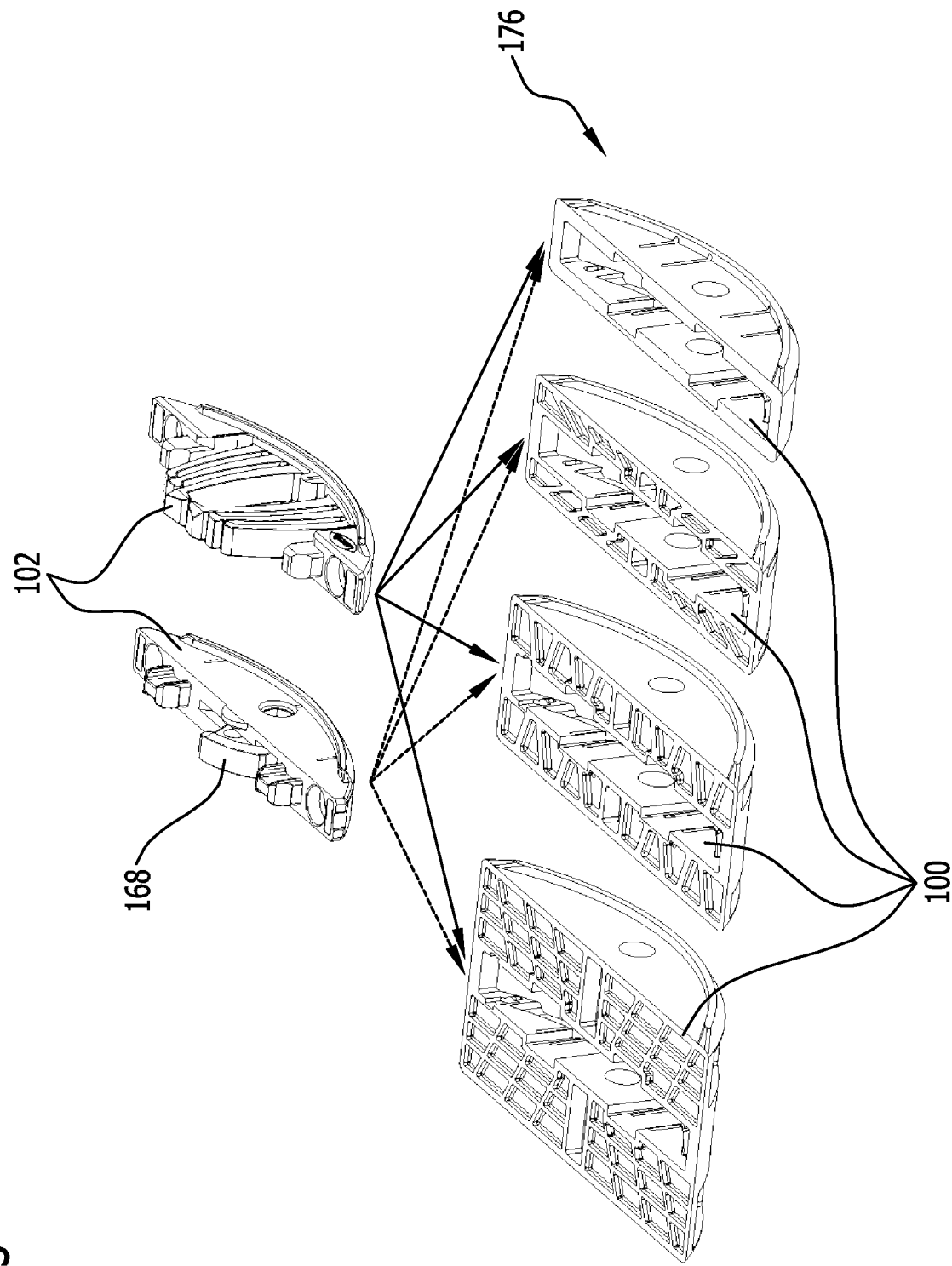
FIG. 13 a schematic representation to illustrate the flexibility in the use of the adapter elements described.

The passage opening 166 serves in particular to actuate a movable holding element 168 of a connecting element 102 comprising such a holding element 168 when this connecting element 102 is accommodated in the adapter element 100 (see in particular FIG. 13 in combination with FIG. 5).

Due to the arrangement of a passage opening 166 on both sides, the holding element 168 is preferably accessible independently of the orientation of the connecting element 102 in the adapter element 100.

One or both passage openings 166 can be designed as a slot or as an elongated hole or as a multiple hole, for example, so that in particular holding elements 168 of different connecting elements 102 are accessible at different depths along the depth direction, for example.

As can be seen in FIG. 7, the adapter element 100, which in particular can be designed in different dimensions along the thickness direction 108, can be pushed into a suitable receiving section 116 in a component 106, for example.

It is also apparent from FIG. 7 and also from FIG. 13 that different types of adapter elements 100, in particular those adapter elements 100 with different extensions along the thickness direction 108, preferably have identically dimensioned receiving sections 142, so that regardless of the design of the respective fixing section 118 of the respective adapter element 100 it is possible to accommodate one and the same connecting element 102. In particular, different types of connecting elements 102 can be accommodated in the adapter elements 100, at least when the different types of connecting elements 102 have identical or at least highly similar shapes in an area provided for fixing them.

The embodiment of the adapter element 100 shown in FIGS. 1 to 5 is designed in one piece, for example. In particular, the main body 122, which includes the fixing section 118 and the receiving section 142 and surrounds the cavity 144, is manufactured or can be manufactured as a single component in an injection molding process, for example in a single injection molding step.

An alternative embodiment of an adapter element 100 shown in FIGS. 8 to 11 differs from the embodiment shown in FIGS. 1 to 5 essentially in that the main body 122 is designed in multiple parts.

In particular, two parts 170 are preferably provided to manufacture a main body 122, the two parts being connectable to one another, for example, to complete the main body 122, in particular by means of a tongue and groove connection 172.

As an alternative or in addition to this, the two parts 170 can be connected by means of a latching connection and/or a screw connection and/or a material connection.

The two parts 170 can be connected to one another, in particular on a wall 174 forming the bottom side 140 of the main body 122; in particular the two parts can be placed against one another and fixed to one another.

The parts 170 are preferably designed identically to one another, so that the main body 122 can be assembled using two halves of the main body 122 that are of an identical design.

Figure 8:
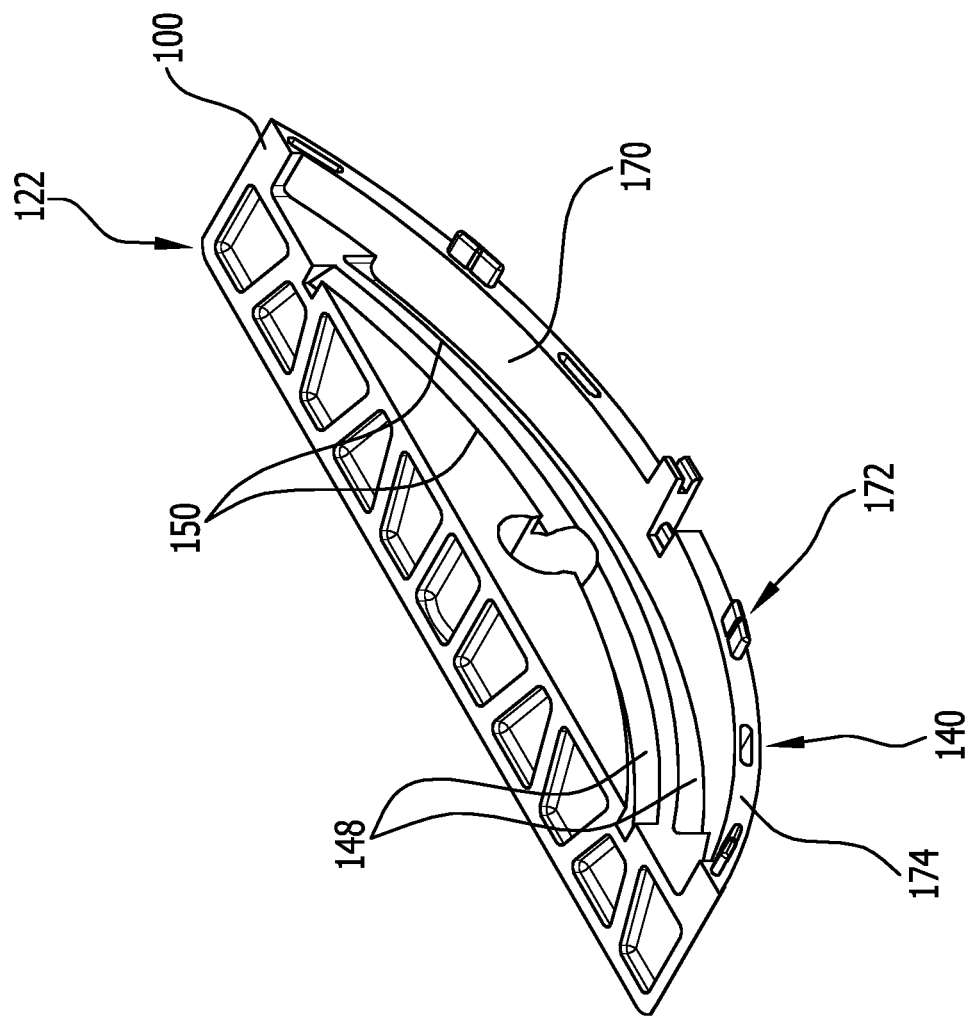
FIG. 8 a schematic perspective view of a part for manufacturing a main body of a second embodiment of an adapter element.
Figure 9:
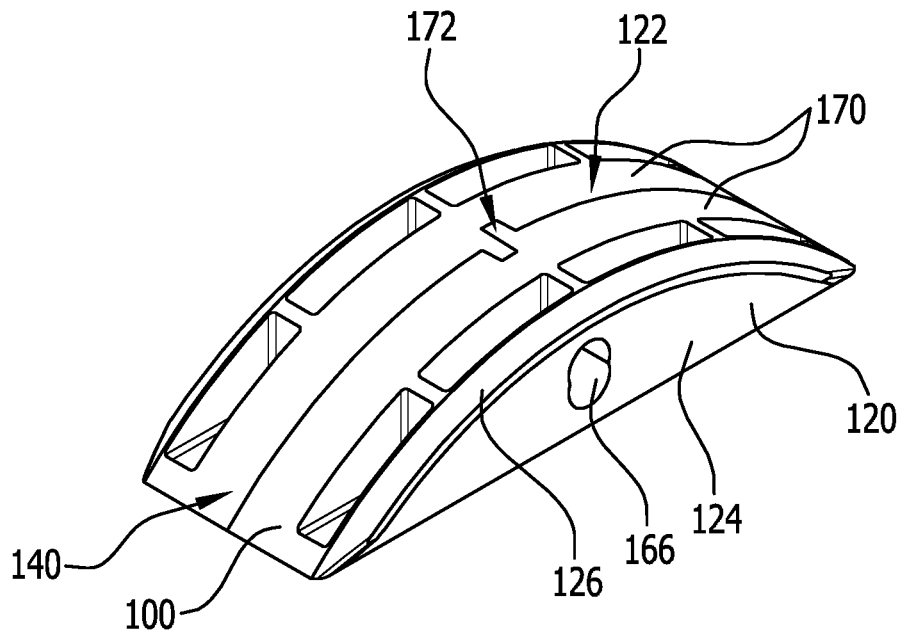
FIG. 9 a schematic perspective view of two parts connected to one another for manufacturing a main body of the adapter element from FIG. 8.
Figure 10:
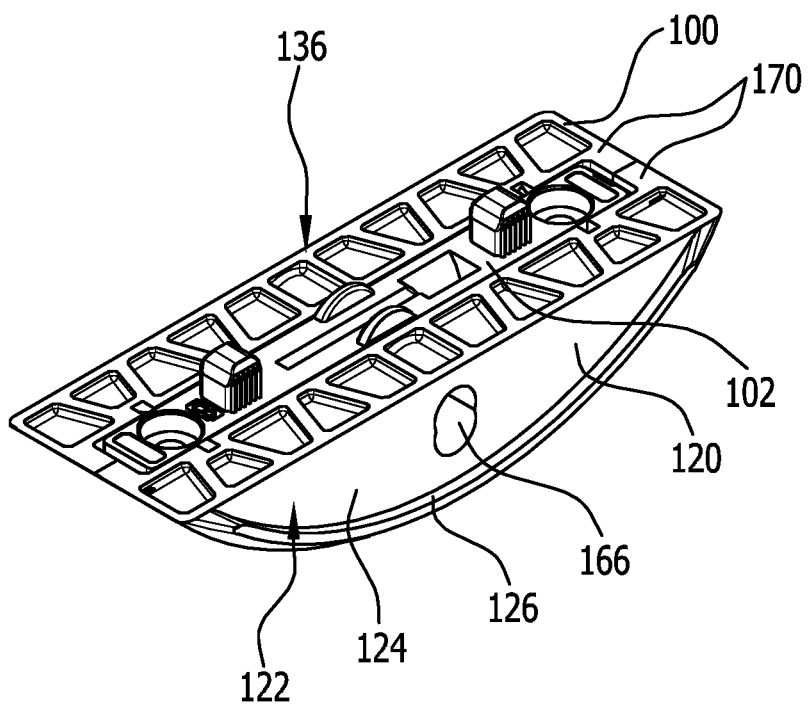
FIG. 10 a further schematic perspective view of the adapter element from FIG. 9, wherein a connecting element is accommodated therein.
Figure 11:
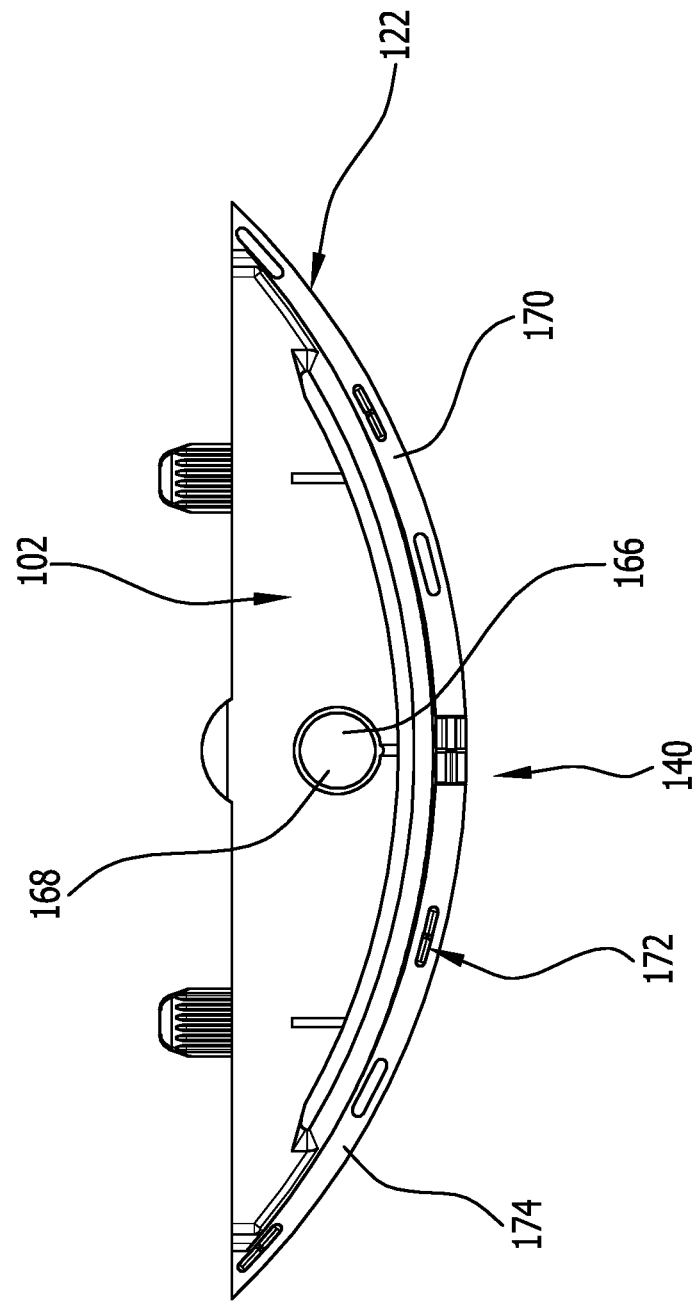
FIG. 11 a schematic sectional view corresponding to FIG. 5 through the adapter element and the connecting element accommodated therein according to FIG. 10.

As can be seen in particular from FIG. 8, it can be provided that an adapter element 100 has a plurality of receiving grooves 148 and/or supporting projections 150 at different depths along the depth direction 130. In this way, in particular, different types of connecting elements 102, which differ from one another in their dimensioning along the depth direction 130, for example, can be arranged in the same adapter element 100, in particular the same type of adapter element 100.

This is of course independent of the number of parts 170 for manufacturing the main body 122, but is explained here due to the simplified representation option with regard to the embodiment according to FIGS. 8 to 11.

A connecting element 102 is in particular fixed in the adapter element 100 in that it is inserted between the two parts 170 and fixed between the two parts 170 by connecting the two parts 170 to one another, in particular fixed in a form-fitting manner.

Otherwise, the embodiment of the adapter element 100 shown in FIGS. 8 to 11 corresponds in terms of structure and function to the embodiment represented in FIGS. 1 to 5 such that reference is made to the above description thereof.

Figure 12:
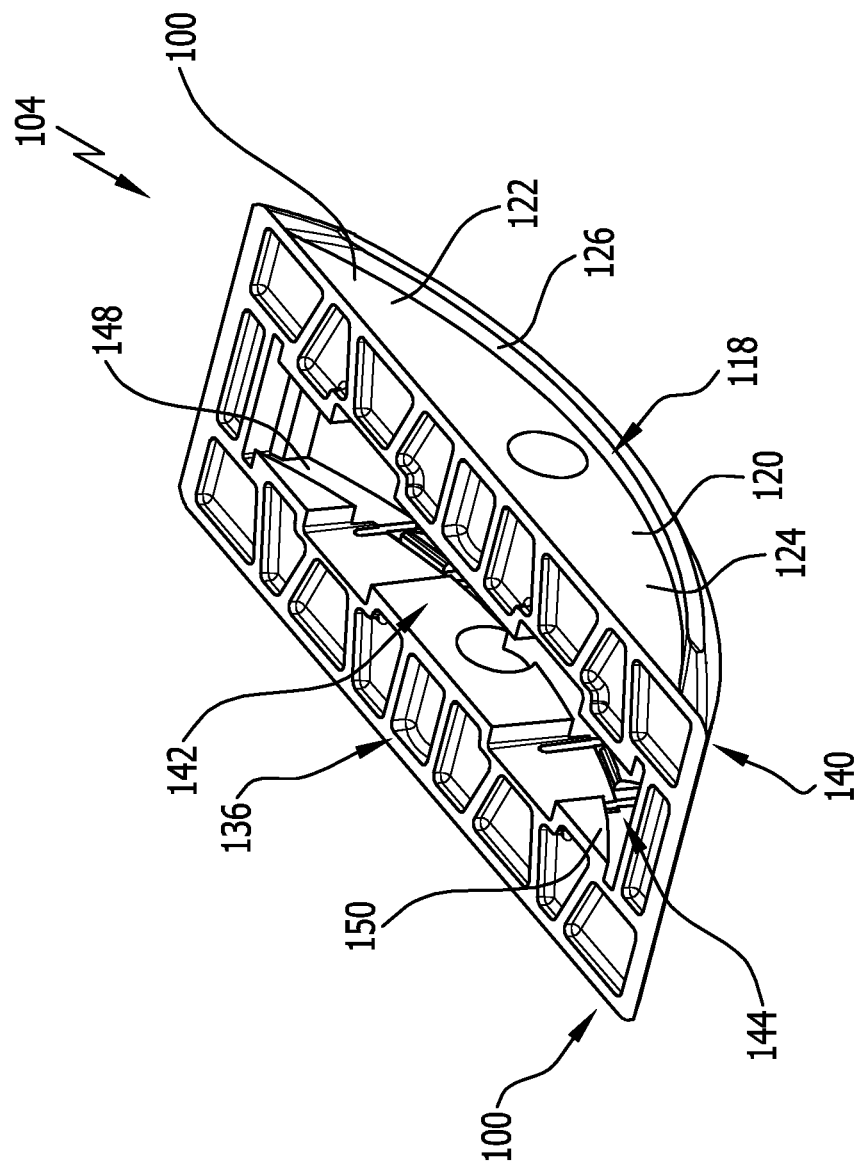
FIG. 12 a schematic perspective view of a third embodiment of an adapter element, in which a connecting element can optionally be inserted into the adapter element from a upper side of the adapter element.

A further alternative embodiment of an adapter element 100 shown in FIG. 12 differs from the embodiment shown in FIGS. 1 to 5 essentially in that connecting element 102 can be alternatively introduced into the receiving section 142 either from the upper side 136 or into the receiving section 142 from the bottom side 140.

When introducing through the bottom side 140, the connecting element 102 can be moved past the latching projections 164 in particular in order to accommodate the holding projections 146 of the connecting element 102 between the latching projections 164 and the supporting projections 150.

When introducing from the upper side 136, the connecting element 102 with its holding projections 146 is pushed into the adapter element 100, in particular along the receiving grooves 148 thereof.

Otherwise, the embodiment of the adapter element 100 shown in FIG. 12 corresponds in terms of structure and function to the embodiment shown in FIGS. 1 to 5, such that reference is made to the above description thereof.

As already mentioned above, FIG. 13 illustrates in particular that various embodiments of adapter elements 100 can be provided which differ from one another in terms of their extension in the direction of thickness 108, but at the same time serve to accommodate connecting elements 102 that are at least partially identical or have a highly similar shape.

A plurality of adapter elements 100 of different types, in particular of different extents along the thickness direction 108, can in particular form part of a set 176 of adapter elements 100.

Individual adapter elements 100 can be selected from such a set 176, in particular adapted to the respective material thickness of a component 106, in order to enable optimal anchoring of a connecting element 102 in the component 106 adapted to said respective component 106.

A further embodiment of an adapter element 100 shown in FIGS. 14 to 17 differs from the embodiment shown in FIGS. 1 to 5 essentially in that the adapter element 100 is designed in multiple parts.

In contrast to the embodiment according to FIGS. 8 to 11, however, the adapter element 100 is not divided in the area of the receiving section 142. Rather, the receiving section 142 is designed at least approximately completely by a one-piece main body 122 of the adapter element 100.

The other parts 170 of the adapter element 100, provided in addition to the main body 122, include one or more side parts 178 which can be arranged adjacent to the main body 122 in particular in the thickness direction 108 thereof.

In the following, reference is made to a side part 178 in the singular as well as in the plural. In principle, only a single or also two side parts 178 can be provided in all variants of the adapter element. In addition, it is conceivable that further side parts 178 can be arranged (not shown) on the side parts 178 themselves in order to enable still further extensions of the adapter element 100 along the thickness direction 108.

Figure 15:
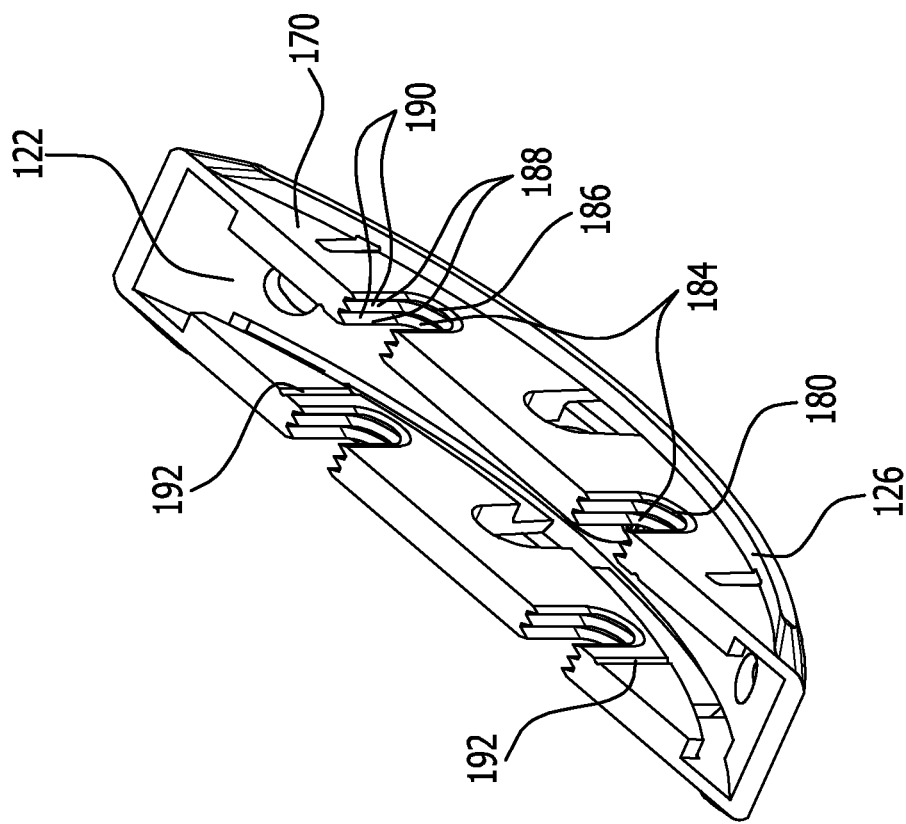
FIG. 15 a schematic perspective representation of the main body of the adapter element from FIG. 14.

As can be seen in particular from FIG. 15, the main body 122 preferably already comprises both the receiving section 142 and one or more retaining projections 126 for fixing in a component 106.

The side parts 178 preferably each have one or more retaining projections 126.

The main body 122 can preferably be fixed in place in a component 106 on its own and/or in combination with a side part 178 and/or in combination with two or more side parts 178, for example by means of retaining projections 126.

Figure 14:
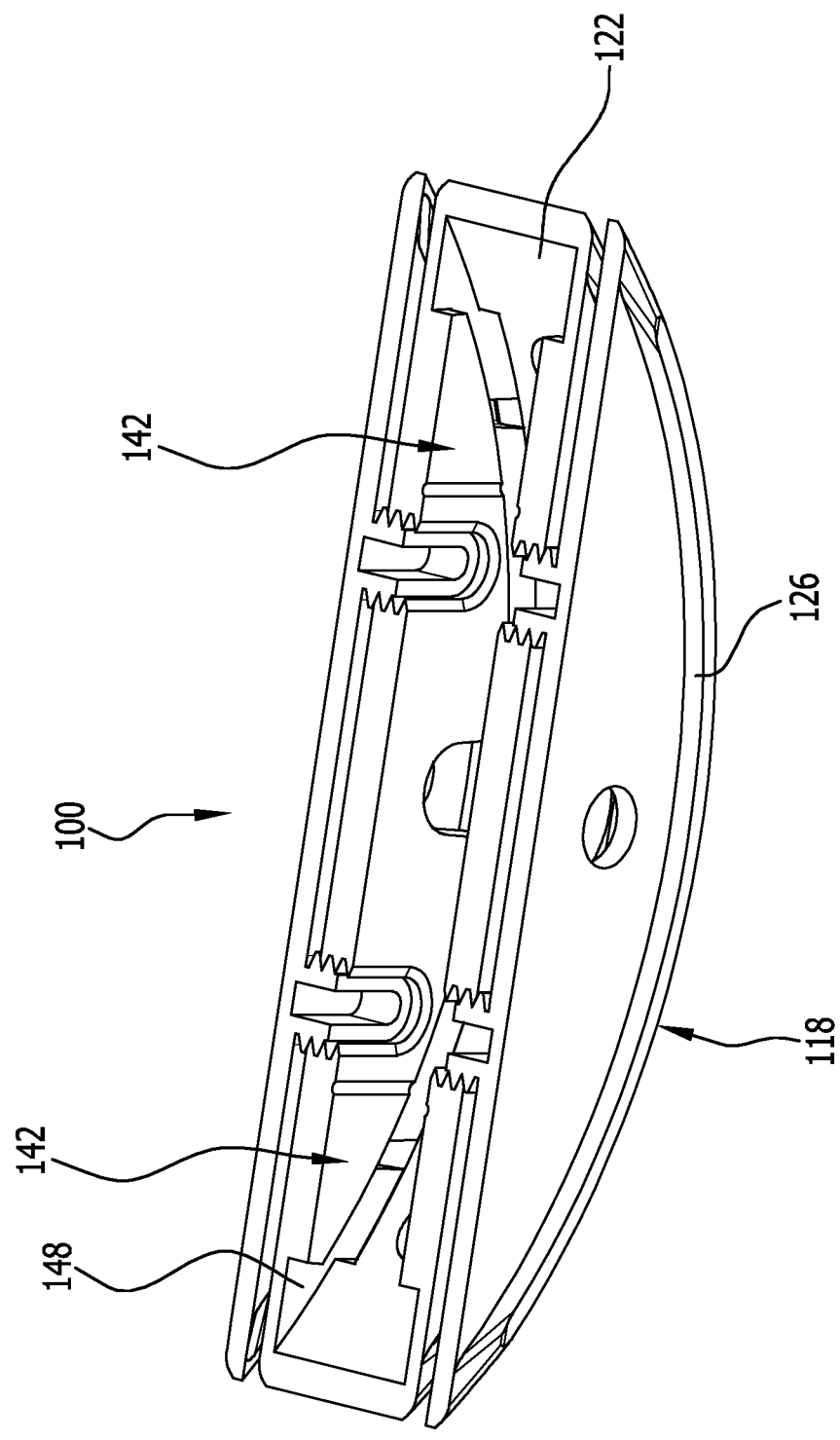
FIG. 14 a schematic perspective representation of a further embodiment of an adapter element which comprises a central main body and two side parts, wherein the side parts can be fixed at different distances from the main body by means of a grid structure.
Figure 16:
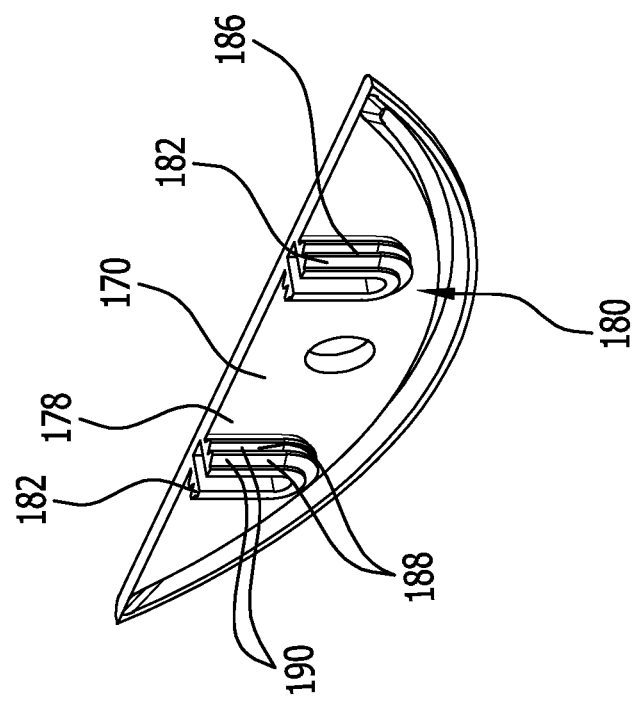
FIG. 16 a schematic perspective representation of a side part of the adapter element from FIG. 14.

As can also be seen from FIGS. 14 to 16, the adapter element 100 preferably comprises one or more connection areas 180.

For example, one or more connecting areas 180 are arranged on each outer wall 120 bordering the main body 122 in the thickness direction 108 (or only on one of these outer walls 120), the connection areas being brought into engagement with one or more connecting areas 180 of a side part 178, the areas being designed to be complementary thereto at least in sections.

For example, each side part 178 comprises one or more spacer elements 182 which can be introduced into one or more spacer element receptacles 184 which are at least partially designed to be complementary to a spacer element 182.

In particular, one or more grid structures 186 are formed by means of the spacer elements 182 and/or the spacer element receptacles 184, the side parts 178 thereby preferably being able to be fixed at different distances from the main body 122 relative to the same.

In particular, it can be provided that one or more retaining projections 126 of the respective side part 178 can be fixed at different distances from the main body 122 by means of the grid structure 168.

It can be favorable if one or more spacer element receptacles 184 and/or one or more spacer elements 182 each have one or more spacer projections 188 and/or one or more spacer recesses 190.

Spacer projections 188 and/or spacer recesses 190 serve in particular to form a grid structure 186.

The spacer projections 188 are preferably configured and/or arranged at least in sections complementary to the spacer recesses 190.

It can be advantageous if the spacer element 182 and/or the spacer element receptacle 184 each includes one or more spacer projections 188 and/or one or more spacer recesses 190.

It can be provided that the spacer element 182 is essentially U-shaped, for example, and can be introduced into a spacer element receptacle 184 which is complementary thereto in the main body 122.

As can also be seen in FIG. 15, an adapter element 100 can be provided with one or more positioning grooves 192, in particular independently of the rest of its design. As can be seen in particular in connection with FIG. 3, such a positioning groove 192 can be made to engage with a positioning projection 194 of a connecting element 102 so as to be able to fix the connecting element 102 in a desired preferable position in the receiving section 142 of the adapter element 100.

Different possible uses for the adapter element 100 shown in FIGS. 14 to 16 are shown in FIG. 17.

Going from left to right in FIG. 17, initially only the main body 122 is provided with a correspondingly minimum spacing in the direction of thickness 108 between the effective retaining projections 126, while the subsequent usage variants of the adapter element 100 that follow to the right in the drawing have continuously increasing dimensions in the direction of thickness 108 since first a single side part 178 is arranged in a minimum extension position on the main body 122, followed by two side parts 178 each in the minimum extension position thereof. Ultimately, first one side part 178 and finally both side parts 178 are fixed in an outwardly offset manner.

Both the main body 122 and the side parts 178 can in particular be manufactured and/or formed in one piece. For example, the manufacture of the main body 122 and/or one or more side parts 178 can be provided in an injection molding process, in particular a plastic injection molding process.

Otherwise, the embodiment of an adapter element 100 shown in FIGS. 14 to 17 corresponds in terms of structure and function to the embodiments in FIGS. 1 to 5, such that reference is made to the above description thereof.

Figure 18:
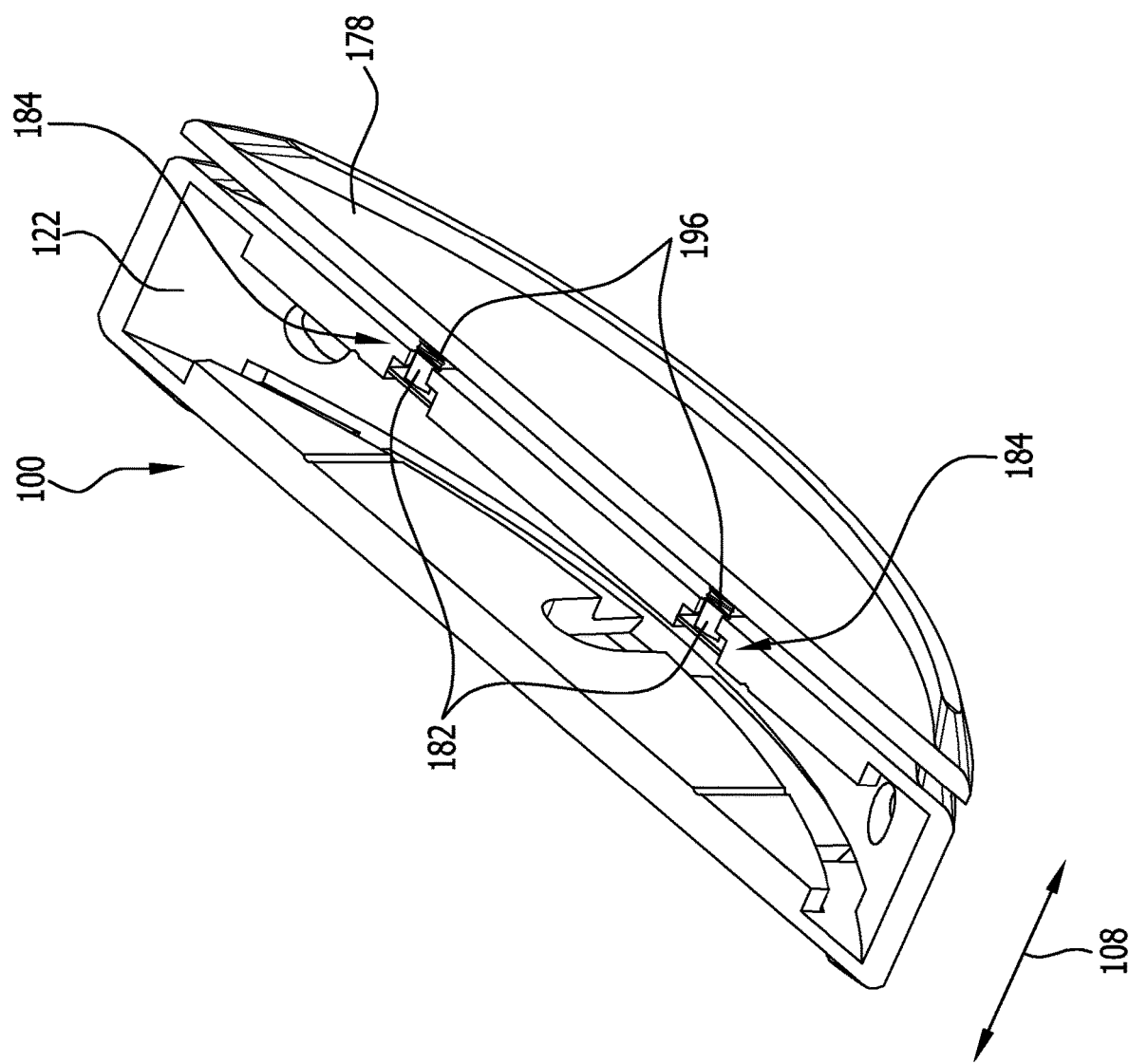
FIG. 18 a schematic perspective view of a further embodiment of an adapter element in which a side part is arranged resiliently on the main body.

Another alternative embodiment of an adapter element 100 shown in FIG. 18 differs from the embodiment shown in FIGS. 14 to 17 essentially in that the spacer elements 182 are fixed or can be fixed in the spacer element receptacles 184.

One or more spacer springs 196 are arranged in particular as compression springs between the main body 122 and a side part 178, so that the spacer springs 196 in particular push the side part 178 outwards away from the main body 122 in a thickness direction 108. By means of such a design of an adapter element 100, in particular connecting elements 102 can be fixed in components 106 with varying thicknesses of the receiving sections 116 without an exact extension in the thickness direction 108 always having to be set in advance for the adapter element 100.

Because the spacer spring 196 acts in the thickness direction 108 and thus perpendicular to an extension direction (depth direction 130), the at least one spacer spring 196 does not have to have any holding forces applied in order to hold the components 106 in the installed state of the adapter element 100 together with a connecting element 102 accommodated therein for connecting components 106 to one another. Rather, the at least one spacer spring 196 only has to ensure reliable anchoring of the holding projections 126 in the section projections 134 of the respective component 106.

In order to prevent the side part 178 from separating from the main body 122 in an undesired manner, one or more spacer elements 182 have a T-shaped cross section, for example, and engage behind the respective spacer element receptacle 184, preferably in the direction of thickness 108.

In the embodiment of the adapter element 100 illustrated in FIG. 18, only a single side part 178 is provided, which is fixed to the main body 122 by means of one or more spacer springs 106.

However, configurations are also conceivable in which two or more side parts 178 are arranged resiliently on the main body 122 by means of one or more spacer springs 196 in each case.

Otherwise, the embodiment of the adapter element 100 shown in FIG. 18 corresponds in terms of structure and function to the embodiment shown in FIGS. 14 to 17, such that reference is made to the above description thereof.

Figure 19:
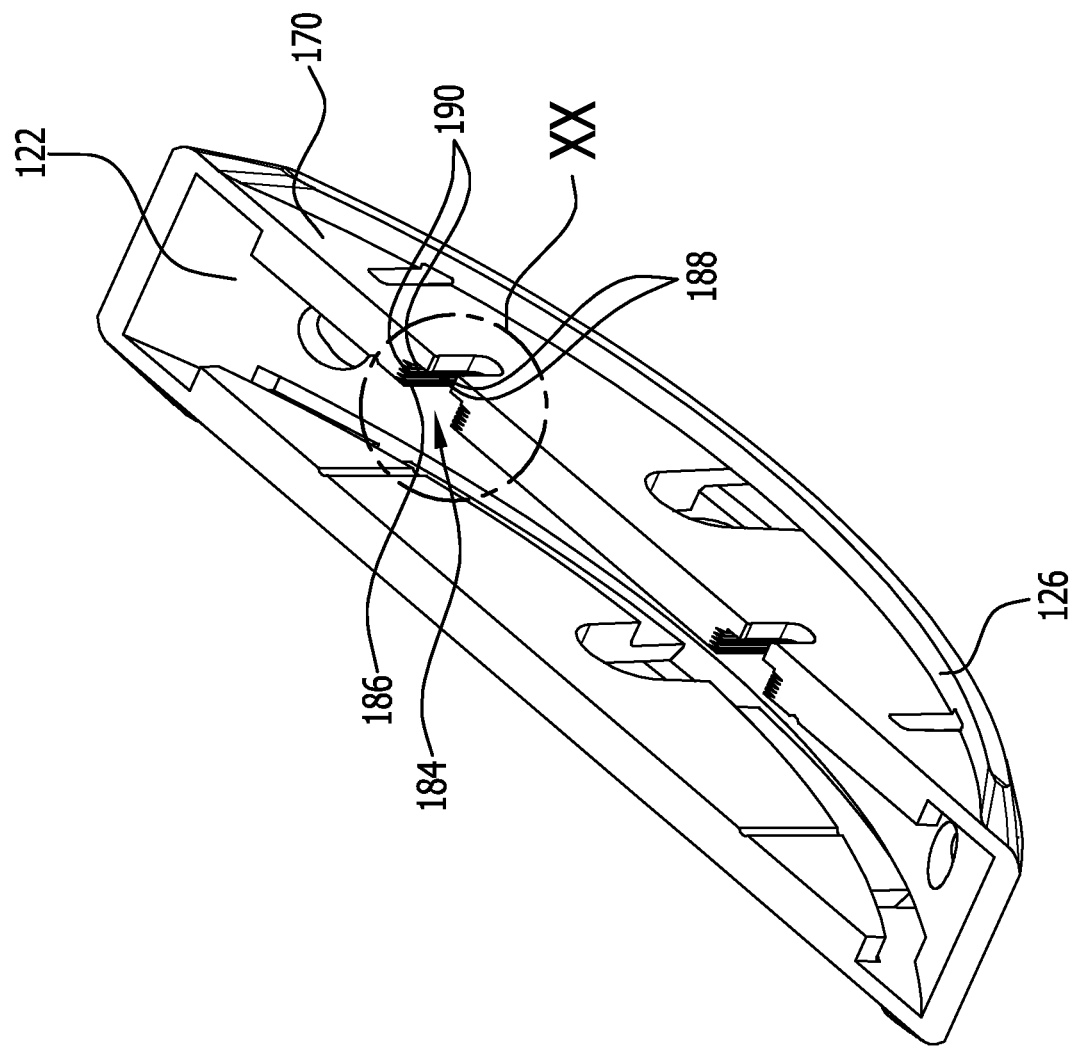
FIG. 19 a schematic perspective representation of a main body of a further embodiment of an adapter element, in which a side part, for example the side part according to FIG. 18, can be fixed in different positions on the main body.
Figure 20:
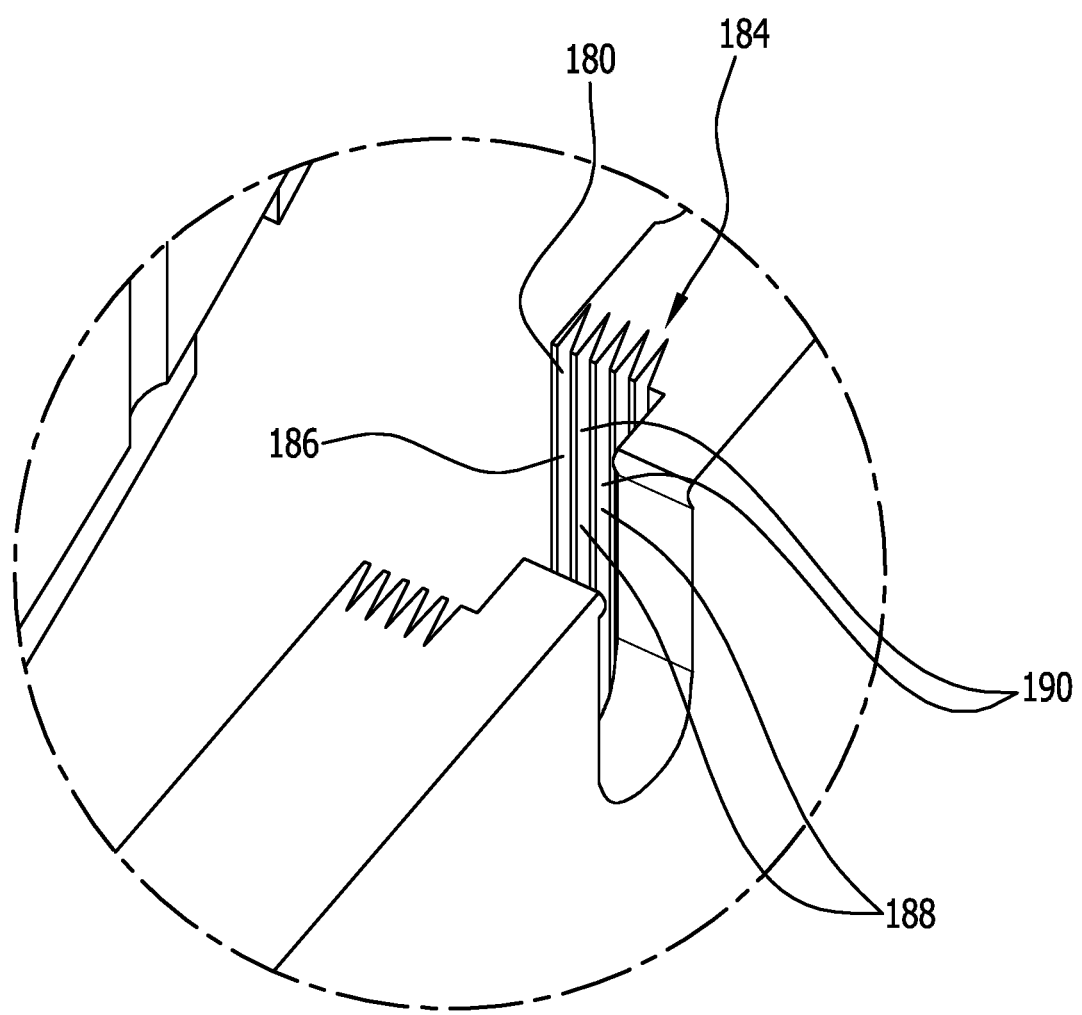
FIG. 20 an enlarged representation of the region XX in FIG. 19.

A further alternative embodiment of an adapter element 100 shown in FIGS. 19 and 20 differs from the embodiment shown in FIG. 18 essentially in that the side part 178 can be fixed by means of a grid structure 186 (similar to the embodiment shown in FIGS. 14 to 17) to the main body 122.

According to the embodiment shown in FIG. 18, however, one or more spacer elements 182 are T-shaped, with the spacer element receptacles 184 complementary thereto enabling an undercut (see in particular FIG. 20).

Otherwise, the embodiment of an adapter element 100 shown in FIGS. 19 and 20 corresponds in terms of structure and function to the embodiment shown in FIG. 18, such that reference is made to the above description thereof.

Figure 21:
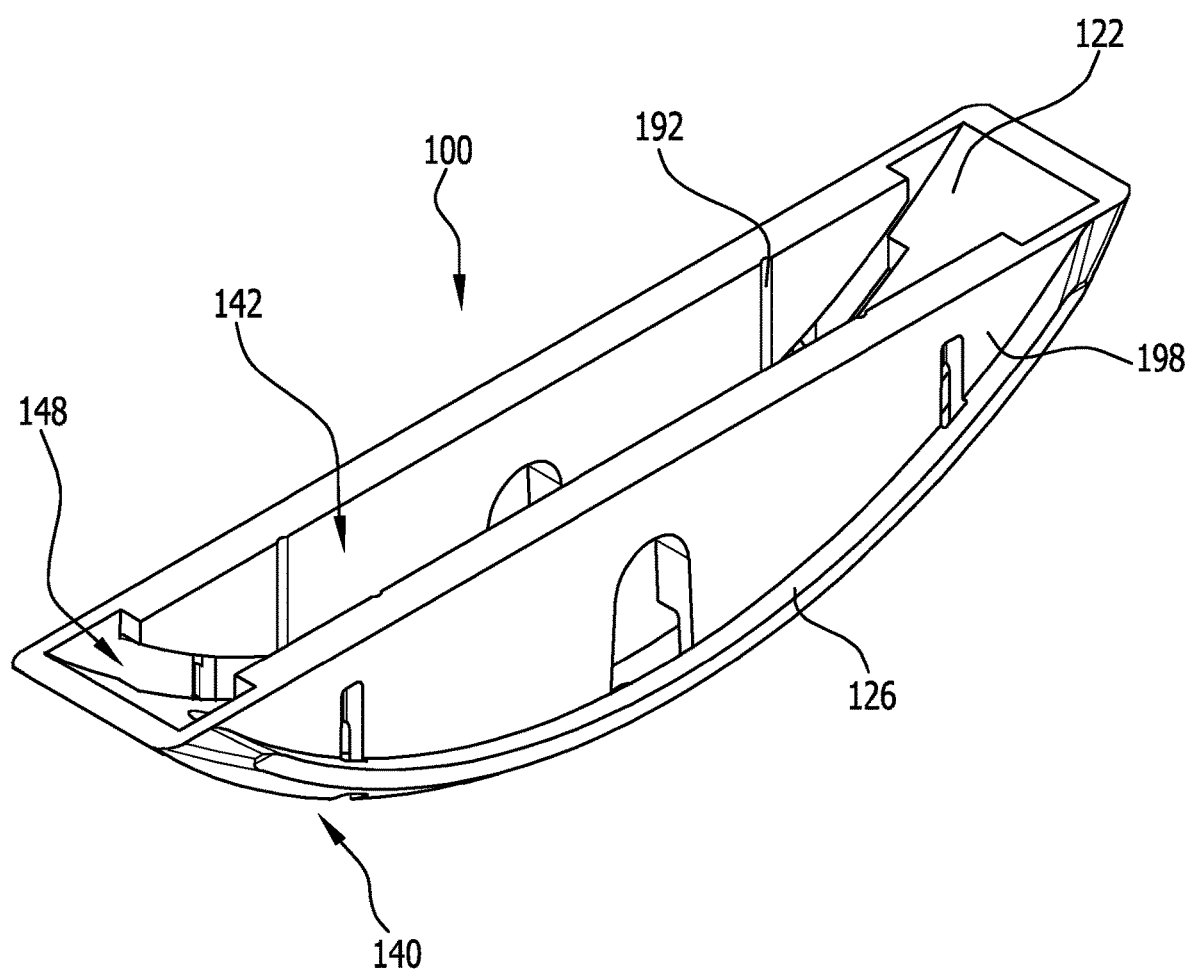
FIG. 21 a schematic perspective view of a further embodiment of an adapter element in which the adapter element is formed in one piece.
Figure 22:
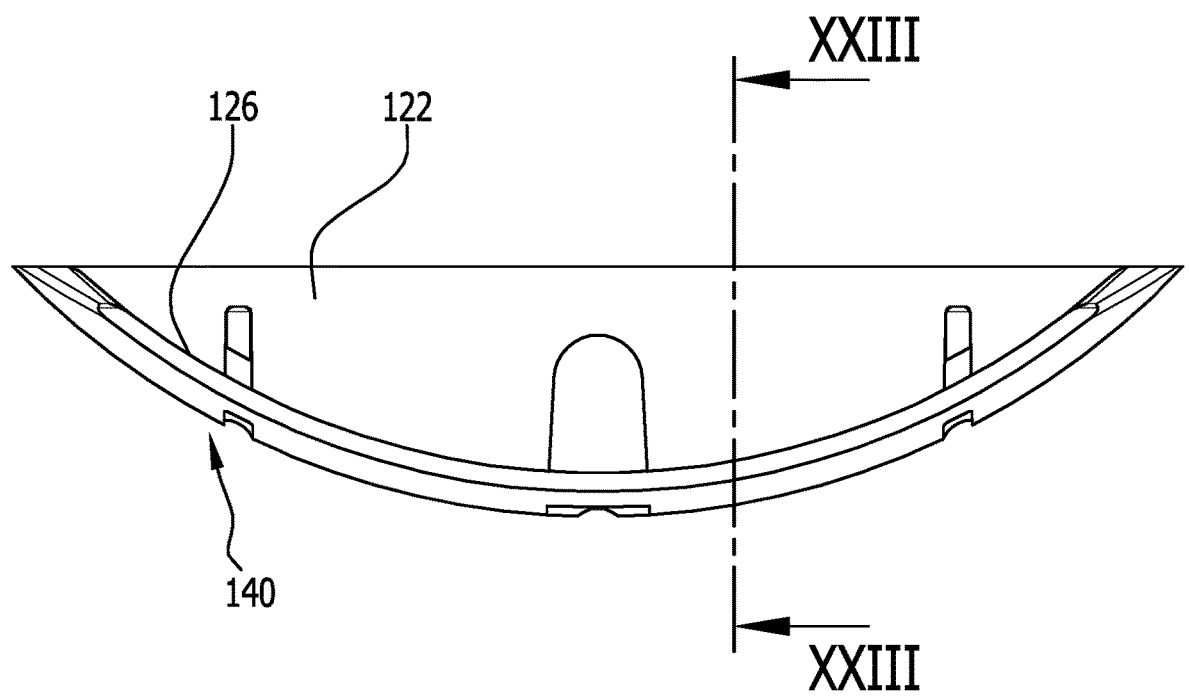
FIG. 22 a schematic side view of the adapter element from FIG. 21.
Figure 23:
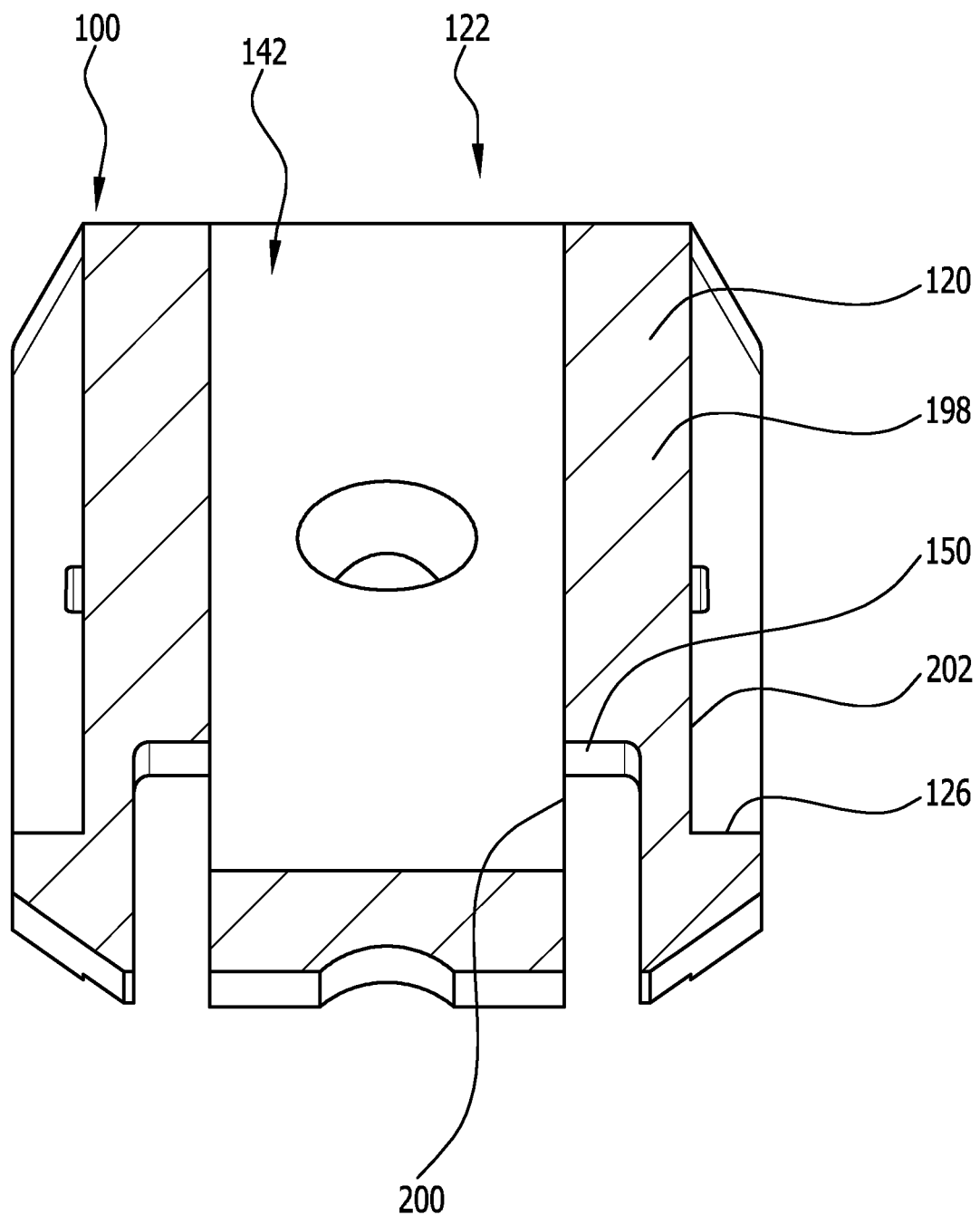
FIG. 23 a schematic section through the adapter element of FIG. 21 along the line XXIII-XXIII in FIG. 22.

A further alternative embodiment of an adapter element 100 shown in FIGS. 21 to 23 differs from the embodiment shown in FIG. 12 essentially in that a smaller extension in the thickness direction 108 is provided.

Otherwise, the embodiment shown in FIGS. 21 to 23 serves in particular to illustrate the mode of operation and/or the basic structure of the adapter element 100.

FIG. 23 in particular shows that the wall 198 has a supporting projection 150 on its inner side 200 facing the receiving section 142 and a retaining projection 126 on its outer side 202 facing away from the receiving section 142.

Each of the walls 198 is preferably constructed in this way.

The support projection 150 and the retaining projection 126 are spaced apart from one another depending on the thickness of the wall 198, in particular overall in order to allow variations for fixing different connecting elements 102 in differently dimensioned components 106, in particular receiving sections 116 of the components 106.

Otherwise, the embodiment of the adapter element 100 shown in FIGS. 21 to 23 corresponds in terms of structure and function to the embodiment shown in FIG. 12, such that reference is made to the above description thereof.

Figure 24:
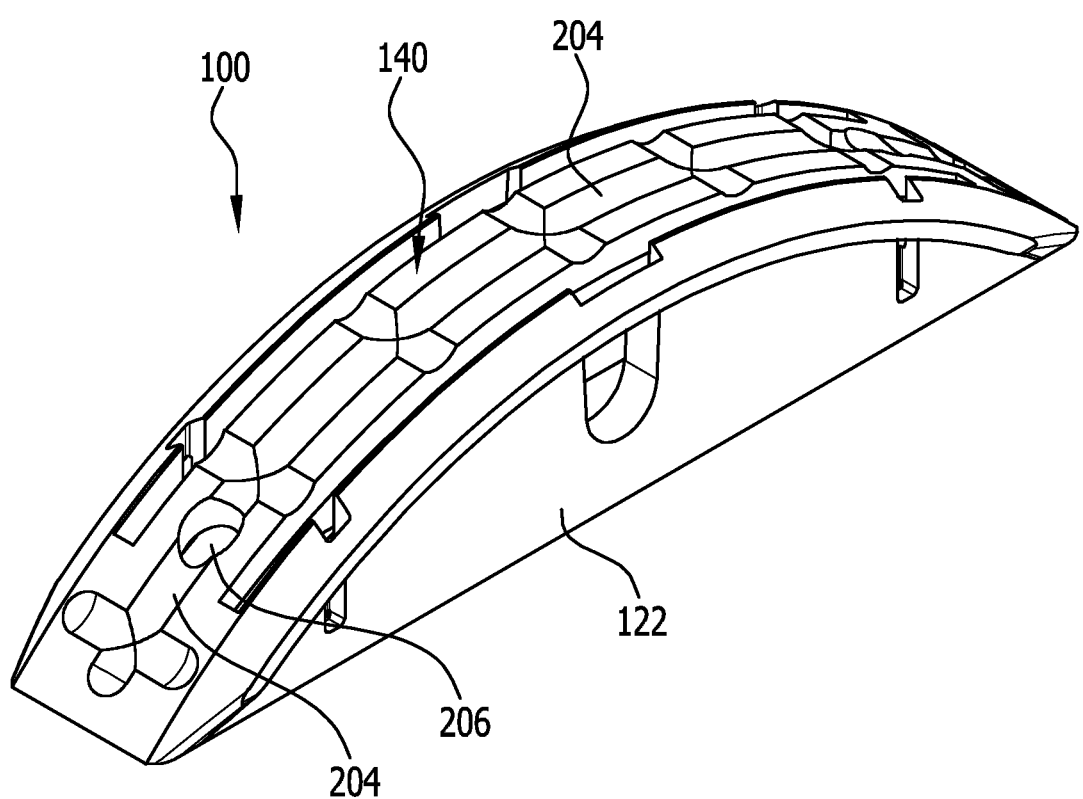
FIG. 24 a schematic representation of a bottom side of an adapter element.

A bottom view of an adapter element 100 shown in FIG. 24 can basically be provided in this form in all variants of adapter elements 100 shown and described.

The bottom side 140 of the adapter element 100 is in particular provided with flow channels 204 which contribute to the form-fitted connection when the components 106 are glued and/or when an adapter element 100 is glued to a component 106, and/or can absorb excess adhesive.

It can be favorable if the adapter element 100 and/or a connecting element 102 to be arranged therein has one or more insertion openings 206 which in particular extend through the adapter element 100 and/or the connecting element 102 in the depth direction 130 and thus from an outside and/or upper side 136 of the adapter element 100 allow the introduction of connecting material, in particular adhesive, into the area on the bottom side 140 of the adapter element 100.

Figure 25:
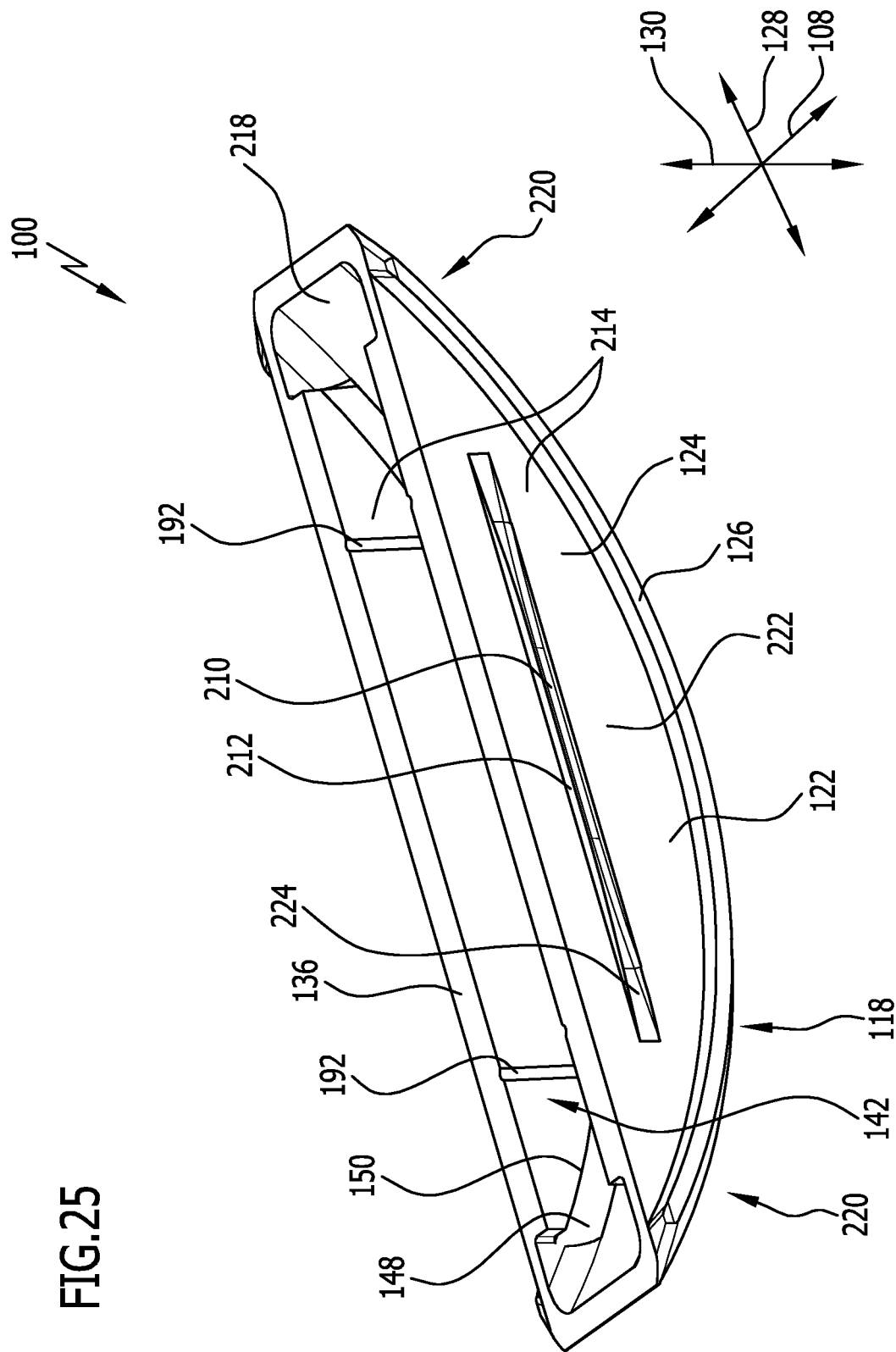
FIG. 25 a schematic perspective representation of a further embodiment of an adapter element in which retaining elements are provided for optimized anchoring of the adapter element in a component designed, for example, as a lightweight board.
Figure 26:
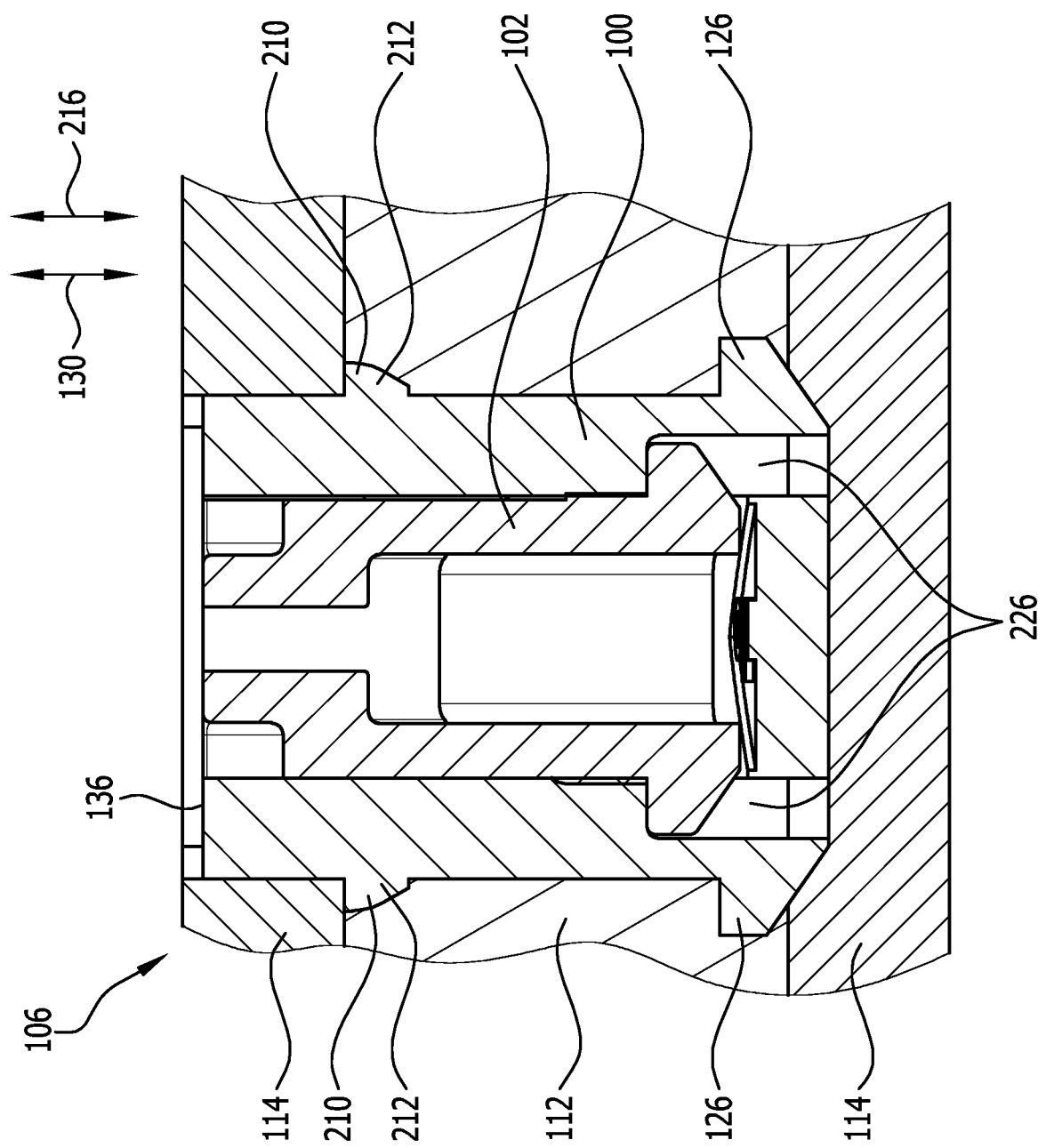
FIG. 26 a schematic vertical cross section through the adapter element from FIG. 25 in the installed state of the same.
Figure 27:
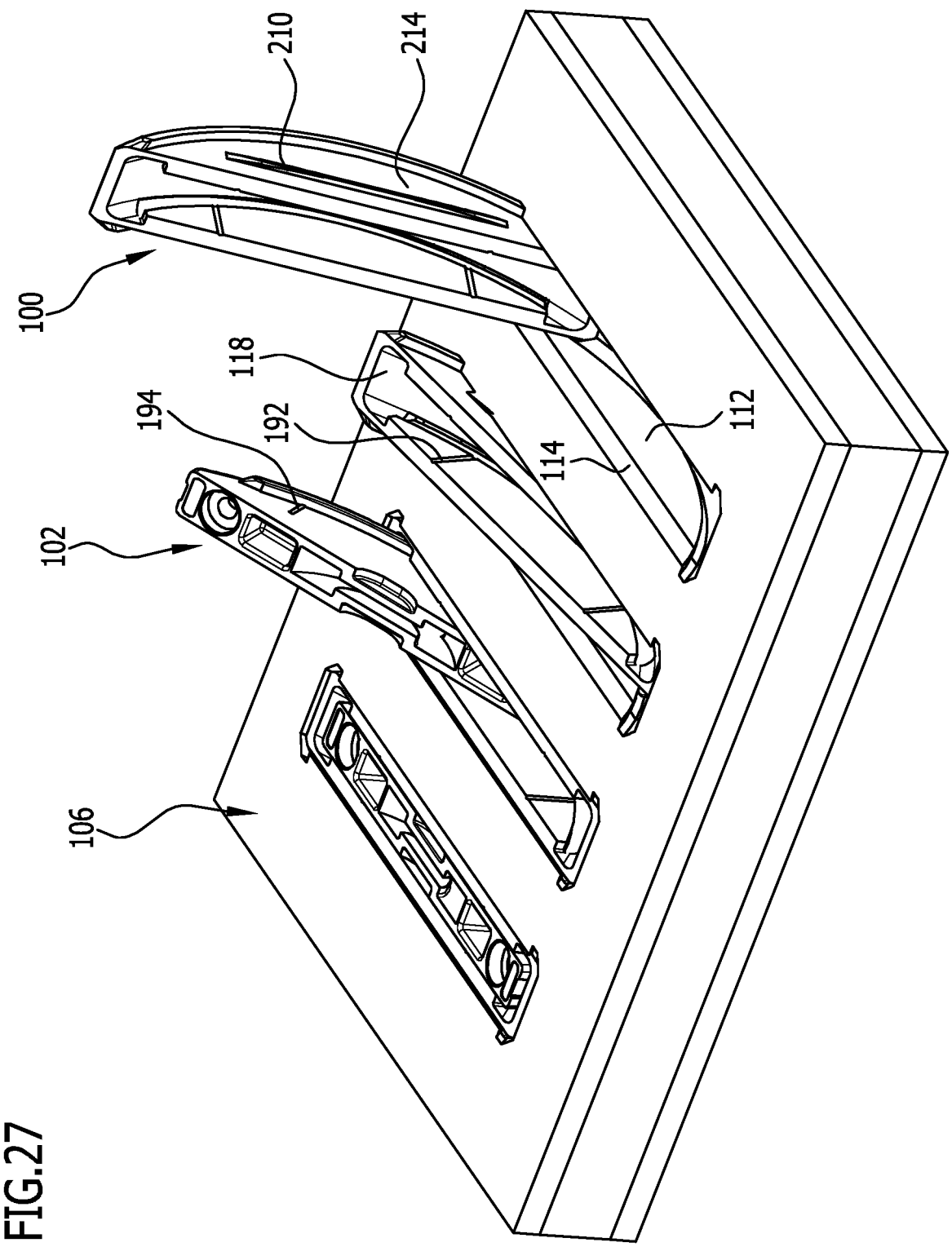
FIG. 27 a schematic perspective representation of adapter elements according to the embodiment in FIG. 25, wherein the adapter elements are shown in different installed states on a component and together with a connecting element.

A further embodiment of an adapter element 100 shown in FIGS. 25 to 27 differs from the embodiment of an adapter element 100 shown in FIGS. 21 to 23 essentially in that one or more, in particular two, retaining elements 210 are provided.

The retaining elements 210 are in particular retaining projections 212 which extend on side walls 214 of the main body 122 of the adapter element 100.

As can be seen in particular from FIG. 26, the retaining elements 210 are arranged set back from the upper side 136 of the adapter element 100 in the depth direction 130 of the adapter element 100.

If the adapter element 100 is arranged in a component 106 designed as, for example, a lightweight board, the retaining elements 210 can serve in particular to engage behind a cover layer 114 of the component 106, in particular with respect to the depth direction 130 of the adapter element 100 and/or with respect to a thickness direction 216 of the component 106.

The adapter element 100 can thus be fixed in the component 106 in particular in such a way that the depth direction 130 of the adapter element 100 is arranged parallel to the thickness direction 216 of the component 106.

The retaining elements 210 extend in particular within the core 112 of the component 106 directly below one of the two cover layers 114 of the component 106.

As can be seen in particular from FIG. 27, when the adapter element 100 is pushed into the component 106, the retaining elements 210 must be moved past the cover layer 114 of the component 106 in order to be able to grip behind it.

For this purpose, the adapter element 100 is preferably designed to be elastically resilient at least in sections, at least in the area of the retaining elements 210.

For example, it can be provided that the side walls 214 are designed to be flexible, at least in sections.

For this purpose, the main body 122 of the adapter element 100 preferably comprises a curved bottom wall 218 which connects together two side walls 214 arranged on both sides of the receiving section 142.

Each side wall 214 is preferably fixedly connected to the bottom wall 218 only in opposite end areas 220 of the respective side wall 214, in particular connected in one piece.

The end areas 220 are opposite one another, in particular with respect to the longitudinal direction 128 of the adapter element 100.

A middle area 222 of each side wall 214, which is arranged between the two end areas 220 on each side wall 214, is thereby preferably designed to be movable relative to the main surface wall 218, in particular elastically flexible.

The one or more retaining members 210 preferably extend outwardly from each side wall 214 and are preferably located in the middle area 222 of each side wall 214.

By deforming the side wall 214 such that it is deformed into the receiving section 142, the respective retaining element 210 can be moved past the cover layer 114 of the component 106 when the adapter element 100 is pushed in.

As soon as the adapter element 100 has come to rest in the specified installed position in the component 106, the middle area 222 of the respective side wall 214 can preferably move outwards again, i.e. away from the receiving section 142, in order ultimately to reach behind the cover layer 114 (see FIG. 26).

With regard to the depth direction 130 of the adapter element 100 and with regard to the thickness direction 216 of the component 106, this results in a particularly firm anchoring of the adapter element 100 in the component 106.

As can also be seen from FIGS. 25 and 27, provision can also be made for one retaining element 210 or a plurality of retaining elements 210 to be designed as essentially linear edge-like projections, for example. As an alternative or in addition to this, it can be provided that each retaining element 210 comprises or has one or more retaining tips or retaining spines or retaining projections 212 shaped in some other way.

In particular with regard to a simplified installation of the adapter element 100 in the component 106 it can be provided that the retaining element 210 or the retaining elements 210 are designed to be flattened towards the end areas 220 of the side walls 214.

In particular, the retaining elements 210 preferably each have one or more flank areas 224, which enable an essentially continuous transition from a side surface 124 of the respective side wall 214 to the respective retaining projection 212 and thus prevent or at least limit damage to the cover layer 114 when the adapter element 100 is pushed into the component 106.

As can be seen from FIGS. 26 and 27, the adapter element 100 in the component 106 is particularly stable when a connecting element 102 is introduced into the adapter element 100 after the adapter element 100 has been installed in the component 106.

The two side walls 214 are moved apart, in particular pressed apart, in the thickness direction 108 of the adapter element 100 by the introduction of the connecting element 102, so that the retaining elements 210 are ultimately moved into the core 112 and/or under the cover layer 114 of the component 106.

As can be seen in FIG. 26, the side walls 214 are particularly movable, at least in the middle area 222, in particular due to a gap 226 between the bottom wall 218 and the two side walls 214.

The shape of the one or more retaining elements 210 then preferably results in a firm anchoring of the adapter element 100 in the component 106.

By means of one or more positioning projections 194 and corresponding positioning grooves 192 (see FIG. 27), it is also possible in particular to ensure that the connecting element 102 is fixed precisely and reliably in the adapter element 100.

Otherwise, the embodiment of the adapter element shown in FIGS. 25 to 27 corresponds in terms of structure and function to the embodiment described in FIGS. 21 to 23, so that reference is made to the above description thereof.

In particular, if the adapter element 100 is to be arranged in a component 106 in such a way that the depth direction 130 of the adapter element 100 is to be aligned parallel to the thickness direction 216 of the component 106, the retaining elements 210 described can be advantageous for improving an adapter element 100.

The retaining elements 210 are therefore suitable for being optimized in all of the variants of adapter elements 100 described.

LIST OF REFERENCE SIGNS 100 adapter element
102 connecting element
104 connecting device
106 component
108 thickness direction
110 sandwich element
112 core
114 cover layer
116 receiving section
118 fixing section
120 outer wall
122 main body
124 side surface
126 retaining projection
128 longitudinal direction
130 depth direction
132 receiving groove
134 support projection
136 upper side
138 main surface
140 bottom side
142 receiving section
144 cavity
146 retaining projection
148 receiving groove
150 support projection
152 opening
154 pivot-in section
156 support section
158 main surface
160 locking element
162 latching element
164 latching projection
166 passage opening
168 holding element
170 part
172 tongue and groove connection
174 wall
176 set
178 side part
180 connection area
182 spacer element
184 spacer element receptacle 186 grid structure
188 spacer projection
190 spacer recess
192 positioning groove
194 positioning projection
196 spacer spring
198 wall
200 inside
202 outside
204 flow channel
206 insertion opening
210 retaining element
212 retaining projection
214 side wall
216 thickness direction
218 bottom wall
220 end area
222 middle area
224 flank area
226 gap
D overall thickness

The invention claimed is:

1. An adapter element for accommodating a connecting element of a connecting device, the adapter element comprising:
a receiving section for receiving a connecting element of a connecting device, wherein
the receiving section is formed by an interior space of the adapter element; and
a fixing section for fixing the adapter element in a component, wherein
the fixing section is arranged on one or more outer sides of the adapter element, and
the receiving section comprises one or more receiving recesses, or receiving grooves, for receiving one or more retaining projections of a connecting element and/or wherein the fixing section comprises one or more retaining projections for fixing the adapter element in the component.

2. The adapter element according to claim 1, wherein the one or more receiving recesses, or receiving grooves, and/or the one or more retaining projections of the connecting element and/or the one or more retaining projections of the adapter element are curved, or curved in the shape of a circular arc section.

3. The adapter element according to claim 1, wherein the adapter element comprises one or more locking elements, or latching elements, for fixing a connecting element in the receiving section.

4. The adapter element according to claim 1, wherein the adapter element comprises a one-piece main body or a one-piece main body which is designed as an injection-molded plastic component.

5. The adapter element according to claim 1, wherein the adapter element comprises a main body which has a plurality of parts which can be and/or are connected to one another, or a plurality of parts which can be and/or are connected to one another in a detachable manner, one or more or all, of the parts are designed as injection molded plastic components.

6. The adapter element according to claim 5, wherein the main body is manufactured from two parts which are structurally identical to one another and/or are identical in terms of shape.

7. The adapter element according to claim 1, wherein the adapter element has one or more passage openings in at least one side surface through which the receiving section and/or a connecting element accommodated in the receiving section is accessible.

8. The adapter element according to claim 1, wherein one or more receiving recesses, or receiving grooves, and/or one or more retaining projections, of the adapter element extend in and/or along a plane aligned parallel to a longitudinal direction of the adapter element and/or transversely, or perpendicularly, to an upper side of the adapter element and/or transversely, or perpendicularly, to a thickness direction of the adapter element.

9. The adapter element according to claim 1, wherein the adapter element comprises a main body and one or more side parts which can be or are arranged adjacent to the main body, or along a thickness direction of the main body adjacent to the main body.

10. The adapter element according to claim 9, wherein one or more connecting areas are arranged and/or formed on one or both of the outer walls bordering the main body in the thickness direction, the connecting areas able to be brought into engagement or able to be brought into engagement by using one or more connecting areas of a side part designed to be complementary to said outer walls.

11. The adapter element according to claim 9, wherein the side parts can be fixed in different positions and/or distances relative to the main body on the main body.

12. The adapter element according to claim 1, wherein the adapter element has one or more retaining elements which are designed, for example, as one or more retaining projections.

13. The adapter element according to claim 12, wherein the one or more retaining elements are designed as a linear or at least approximately linear projection, in order to facilitate flat contact of the same on and/or below a flat cover layer of a component.

14. A connecting device, for connecting furniture parts and/or machine parts and/or for fixing a component to an object, the connecting device comprising the following:
at least one connecting element and at least one adapter element according to claim 1.

15. The connecting device according to claim 14, wherein the receiving section of the at least one adapter element is designed at least in sections to be complementary to a main body of the at least one connecting element.

16. The connecting device according to claim 14, wherein a main body of the at least one connecting element can be received or is received completely in the receiving section of the at least one adapter element.

17. A component composite, in particular a piece of furniture or a machine, wherein the component composite comprises a plurality of components which are connected to one another by means of at least one connecting device, in particular at least one connecting device according to claim 14, at least one of the components being designed as a sandwich element, and at least one connecting element of the at least one connecting device being fixed on and/or in the at least one component by means of said at least one adapter element.

18. A set of adapter elements for receiving connecting elements of one or more connecting devices, the set comprising several types of adapter elements according to claim 1 which differ from each other
 a) with regard to their dimensioning, in particular with regard to their extension in a thickness direction and/or a depth direction and/or a longitudinal direction; and or
 b) with regard to the design of the respective receiving section, in particular with regard to the number and/or the shape and/or the length and/or the radius of curvature of the respective at least one receiving recess, for example receiving groove; and or c) with regard to the design of the respective fixing section, in particular with regard to the shape and/or the fixing method.

19. A method for establishing a connection between two components and/or for fixing a component on an object, wherein the following is provided:

selecting an adapter element from a set of adapter elements according to claim 18, in particular taking into account a total material thickness and/or core material thickness and/or cover layer thickness of a component;

fixing a connecting element of a connecting device on and/or in the selected adapter element;

inserting the adapter element into a receiving section prefabricated in the component; and optionally establishing the connection between the two components by connecting the connecting element fixed on and/or in the adapter element to a further connecting element of the connecting device and/or optionally fixing the component on the object by connecting the connecting element fixed on and/or in the adapter element to the object.

* * * * *

UNITED STATES PATENT AND TRADEMARK OFFICE
CERTIFICATE OF CORRECTION

| | | |
|---|---|---|
| PATENT NO. | : 12,286,992 B2 | Page 1 of 1 |
| APPLICATION NO. | : 17/739514 | |
| DATED | : April 29, 2025 | |
| INVENTOR(S) | : Heinz Bürk | |

It is certified that error appears in the above-identified patent and that said Letters Patent is hereby corrected as shown below:

On the Title Page

Please add (the following section after item (63)):
-- (30) Foreign Application Priority Data
Nov. 12, 2019 (DE)............10 2019 217 467.1 --

Signed and Sealed this
Twenty-sixth Day of August, 2025

Coke Morgan Stewart
*Acting Director of the United States Patent and Trademark Office*